United States Patent
Ishii et al.

(10) Patent No.: US 7,839,405 B2
(45) Date of Patent: Nov. 23, 2010

(54) APPARATUS, METHOD, AND PROGRAM FOR PROJECTION OF 3D SPATIAL IMAGE INTO PLANAR IMAGES USING VISUAL POINTS

(75) Inventors: Shinya Ishii, Tokyo (JP); Takashi Kitao, Tokyo (JP)

(73) Assignee: Sony Corporation (JP)

( * ) Notice: Subject to any disclaimer, the term of this patent is extended or adjusted under 35 U.S.C. 154(b) by 534 days.

(21) Appl. No.: 11/732,485

(22) Filed: Apr. 3, 2007

(65) Prior Publication Data
US 2008/0036766 A1 Feb. 14, 2008

(30) Foreign Application Priority Data
Apr. 10, 2006 (JP) ............... P2006-107861

(51) Int. Cl.
*G06T 15/20* (2006.01)
(52) U.S. Cl. ...................................... 345/427
(58) Field of Classification Search ............ None
See application file for complete search history.

(56) References Cited

U.S. PATENT DOCUMENTS

| 6,346,938 | B1 * | 2/2002 | Chan et al. .............. 345/419 |
| 7,110,005 | B2 * | 9/2006 | Arvin et al. ............. 345/619 |
| 2001/0022585 | A1 * | 9/2001 | Endo et al. ............. 345/427 |
| 2002/0140698 | A1 * | 10/2002 | Robertson et al. ........... 345/427 |
| 2005/0104881 | A1 * | 5/2005 | Yoshida et al. ............. 345/419 |
| 2005/0225559 | A1 * | 10/2005 | Robertson et al. .......... 345/581 |
| 2006/0132482 | A1 * | 6/2006 | Oh ............................. 345/419 |
| 2008/0049012 | A1 * | 2/2008 | Bar-Joseph et al. ......... 345/419 |

FOREIGN PATENT DOCUMENTS

JP          2005-165283 A       6/2005

* cited by examiner

*Primary Examiner*—Daniel F Hajnik
(74) *Attorney, Agent, or Firm*—Lerner, David, Littenberg, Krumholz & Mentlik, LLP

(57) ABSTRACT

Disclosed herein is a display control apparatus which may include an image conversion unit, a display unit, a point specifying unit, and a visual-point position setting unit.

8 Claims, 14 Drawing Sheets

DDF1

UDF1

US 7,839,405 B2

APPARATUS, METHOD, AND PROGRAM FOR PROJECTION OF 3D SPATIAL IMAGE INTO PLANAR IMAGES USING VISUAL POINTS

CROSS-REFERENCE TO RELATED APPLICATIONS

This application claims priority from Japanese Patent Application No. JP 2006-107861 filed in the Japanese Patent Office on Apr. 10, 2006, the entire content of which is incorporated herein by reference.

BACKGROUND OF THE INVENTION

1. Field of the Invention

The present invention relates to a display control apparatus, a display control method and a display control program. More particularly, the present invention can be suitably applied for example to a navigation apparatus mounted on a car as an apparatus for inverting a three-dimensional spatial image of a stereoscopic map constructed in a three-dimensional virtual space into a two-dimensional planar image by projecting the three-dimensional spatial image onto a two-dimensional plane in order to result in the two-dimensional planar image that will be obtained if the viewer sees the three-dimensional spatial image from a predetermined visual point and for displaying the two-dimensional planar image. The stereoscopic map is constructed in a three-dimensional virtual space typically in a modeling process. Referred to hereafter as a three-dimensional map image, the three-dimensional spatial image of a stereoscopic map is the image of a map created as a three-dimensional computer graphic. On the other hand, the two-dimensional planar image of the map is referred to as a two-dimensional map image in the following description.

2. Description of the Related Art

When the map display apparatus in the past converts a three-dimensional map image into a two-dimensional map image by projecting the three-dimensional map image on a two-dimensional plane in order to result in the two-dimensional map image that will be obtained if the viewer sees the three-dimensional map image from a predetermined visual point, the map display apparatus draws a side face of a building on the two-dimensional map image as a face parallel to the vertical direction of the image. Thus, when the map display apparatus displays the two-dimensional map image on a display unit, the map display apparatus avoids jaggies from being generated on the contours of the side face of the building on the two-dimensional map image as described in documents such as patent reference 1, which is pages 11 and 12 of Japanese Patent Laid-open No. 2005-165283.

SUMMARY OF THE INVENTION

By the way, there is such a map display apparatus for displaying for example a two-dimensional map image 1 shown in FIG. 15A and a two-dimensional map image 3 shown in FIG. 15B on the display screen of a display unit by properly switching the display screen from the two-dimensional map image 1 to the two-dimensional map image 3 and vice versa. The two-dimensional map image 1 is an image generated by projecting a three-dimensional map image on a two-dimensional plane in order to result in the two-dimensional map image that will be obtained if the viewer is looking down the three-dimensional map image in a slanting direction from a visual point existing at a position separated away from the three-dimensional map image in the slanting upward direction. In the following description, the two-dimensional map image 1 is referred to as a two-dimensional slantingly-under long-shot map image 1. On the other hand, the two-dimensional map image 3 is an image generated by enlarging a desired area 2 of a three-dimensional map image and projecting the enlarged area on a two-dimensional plane in order to result in the two-dimensional map image 3 that will be obtained as an enlarged view if the viewer is looking down the area 2 in a vertical direction from a visual point existing at a position right above the area 2. In the following description, the two-dimensional map image 3 is referred to as a two-dimensional right-under long-shot map image 3. In this case, when the user arbitrarily specifies a point P1 on the display screen of the display unit showing the two-dimensional slantingly-under long-shot map image 1, as shown in FIG. 16, the map display apparatus detects a point P2 on the three-dimensional map image as a point corresponding to the point P1. In the following description, the point P1 arbitrarily specified by the user is referred to as a user-specified point. On the other hand, the point P2 is referred to as a specified-point corresponding point in the following description. In addition, a visual-point position is set right above the three-dimensional map image at such at an altitude that the map display apparatus adjusts the focus to the specified-point corresponding point P2 on the three-dimensional map image. Then, the map display apparatus converts the area 2 centered at the specified-point corresponding point P2 right below the visual-point position into a two-dimensional right-under long-shot image 4 by projecting the area 2 on a two-dimensional plane in order to result in the two-dimensional right-under long-shot image 4 that will be obtained if the viewer is looking down the area 2 in the vertical direction from the visual-point position right above the area 2.

However, the map display apparatus displays the two-dimensional right-under long-shot image 4 on the display screen of the display unit by taking the specified-point corresponding point P2 on the three-dimensional map image as the center point of the display screen and adjusting the two-dimensional right-under long-shot image 4 to the center point of the display screen. In the following description, the center point of the display screen is also referred to as a screen center point. Thus, when the user specifies a user-specified point P1 separated away from the center point of the display screen of the display unit displaying the two-dimensional slantingly-under long-shot map image 1 in the map display apparatus, the specified-point corresponding point P2 existing on the three-dimensional map image as a point corresponding to the user-specified point P1 and serving as the center point of the two-dimensional right-under long-shot image 4 is displaced at the center point of the display screen. As a result, the map display apparatus raises a problem that the user is put in the state of confusion about a positional relation between the two-dimensional slantingly-under long-shot map image 1 prior to screen switching and the two-dimensional right-under long-shot image 4 after the display screen switching at the time the display screen of the display unit is switched from the two-dimensional slantingly-under long-shot map image 1 to the two-dimensional right-under long-shot image 4.

Addressing the problems described above, inventors of the invention have proposed a display control apparatus capable of avoiding the state of confusion about a positional relation between first and second two-dimensional planar images at a screen switching time, a display control method to be adopted by the display control apparatus and a display control program implementing the display control method.

In order to solve the problems described above, in accordance with the present invention, a first two-dimensional planar image may be displayed on the display screen of a display unit for displaying any one of the first two-dimensional planar image and a second two-dimensional planar image by switching the display screen from the first two-dimensional planar image to the second two-dimensional planar image and vice versa and, when a point on the display screen of the display unit displaying the first two-dimensional planar image is specified arbitrarily by making use of a point specifying unit for arbitrarily specifying the position of a point to be used for specifying the position of a visual point, the position of a second visual point may be set so as to make a specified-point corresponding point existing on a three-dimensional spatial image as a point corresponding to the specified point face the specified point. In this case, the first two-dimensional planar image may be an image obtained as a result of converting a three-dimensional spatial image constructed in a three-dimensional virtual space by projecting the three-dimensional spatial image on a two-dimensional plane in order to result in the first two-dimensional planar image that will be obtained if the viewer sees the three-dimensional spatial image from a first visual point at a first visual-line angle. On the other hand, the second two-dimensional planar image may be an image obtained as a result of converting the three-dimensional spatial image by projecting the three-dimensional spatial image on the two-dimensional plane in order to result in the second two-dimensional planar image that will be obtained if the viewer sees the three-dimensional spatial image from a second visual point at a second visual-line angle different from the first visual-line angle.

Thus, in accordance with the present invention, when the display screen is switched from the first two-dimensional planar image to the second two-dimensional planar image, it may be possible to make a specified-point corresponding point existing on the three-dimensional spatial image as a point corresponding to a point specified arbitrarily on the display screen of the display unit face the specified point on the second two-dimensional planar image.

In accordance with an embodiment of the present invention, it is possible to implement a display control apparatus wherein a first two-dimensional planar image may be displayed on the display screen of a display unit for displaying any one of the first two-dimensional planar image and a second two-dimensional planar image by switching the display screen from the first two-dimensional planar image to the second two-dimensional planar image and vice versa. When a point on the display screen of the display unit displaying the first two-dimensional planar image is specified arbitrarily by making use of a point specifying unit for arbitrarily specifying the position of a point to be used for specifying the position of a visual point, the position of a second visual point may be set so as to make a specified-point corresponding point existing on a three-dimensional spatial image as a point corresponding to the specified point face the specified point. Thus, it may be possible to avoid the state of confusion about a positional relation between the first two-dimensional planar image displayed prior to screen switching and the second two-dimensional planar image displayed after the display screen switching at the time the display screen of the display unit is switched from the first two-dimensional planar image to the second two-dimensional planar image. In this case, the first two-dimensional planar image may be an image obtained as a result of converting a three-dimensional spatial image constructed in a three-dimensional virtual space by projecting the three-dimensional spatial image on a two-dimensional plane in order to result in the first two-dimensional planar image that will be obtained if the viewer sees the three-dimensional spatial image from a first visual point at a first visual-line angle. On the other hand, the second two-dimensional planar image may be an image obtained as a result of converting the three-dimensional spatial image by projecting the three-dimensional spatial image on the two-dimensional plane in order to result in the second two-dimensional planar image that will be obtained if the viewer sees the three-dimensional spatial image from a second visual point at a second visual-line angle different from the first visual-line angle. In addition, in accordance with the present invention, it may be possible to implement a display control method to be adopted by the display control apparatus and a display control program implementing the display control method.

BRIEF DESCRIPTION OF THE DRAWINGS

These and other objects and features of the present invention will become clear from the following description of the preferred embodiments given with reference to the accompanying diagrams, in which.

DETAILED DESCRIPTION

A preferred embodiment of the present invention is explained earlier by referring to diagrams as follows.

Figure 1:
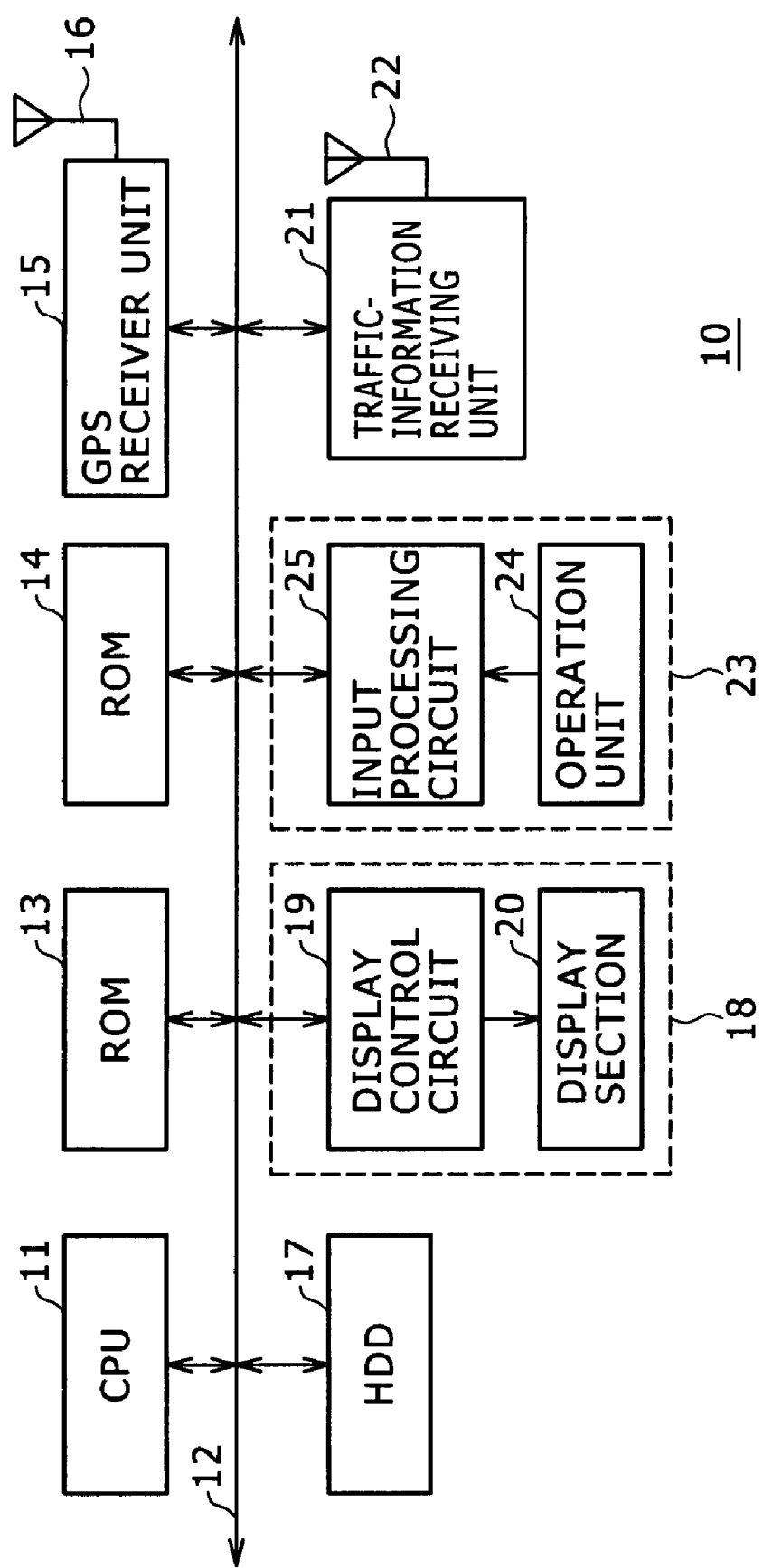
FIG. 1 is a block diagram showing an embodiment implementing the circuit configuration of a navigation apparatus provided by the present invention.

FIG. 1 is a block diagram showing an embodiment implementing the circuit configuration of a navigation apparatus 10 provided by the present invention as an apparatus to be mounted on a car. As shown in the figure, the car navigation apparatus 10 employs a CPU (Central Processing Unit) 11, a ROM (Read Only Memory) 13 and a RAM (Random Access Memory) 14, which are connected to each other by making use of a bus 12. The central processing unit 11 transfers a variety of programs such as a display control program from the ROM 13 to the RAM 14, executing the programs in order to control the entire car navigation apparatus 10 in a coordinated manner and carry out various kinds of processing. The car navigation apparatus 10 also employs a multi-GPS (Global Positioning System) receiver unit 15 for periodically receiving signals from a plurality of GPS satellites not shown in the figure through an antenna 16. The GPS receiver unit 15 carries out a predetermined signal receiving process such as demodulation processing on the received signals in order to obtain measured-position information showing the position of the car in terms of a latitude and a longitude. Then, the GPS receiver unit 15 supplies the measured-position information to the central processing unit 11. On the basis of the measured-position information, the central processing unit 11 determines the present position of the car on which the navigation apparatus 10 is mounted.

The navigation apparatus 10 also employs an HDD (Hard Disk Drive) 17 used for storing three-dimensional map data. The three-dimensional map data includes positional information showing the position of each road, each street, each building and the like in the whole country in terms of a latitude and a longitude. The three-dimensional map data also includes three-dimensional model data showing a stereoscopic model of each road, each street, each building and the like. In the following description, the stereoscopic model is referred to as a three-dimensional model. The central processing unit 11 reads out three-dimensional map data for a predetermined area including the present position of the car from the hard-disk drive 17. Examples of the predetermined area are a city and a town. Then, on the basis of the three-dimensional map data, the central processing unit 11 creates a three-dimensional map image by constructing a stereoscopic map of the predetermined area including the present position of the car in a three-dimensional virtual space taking 3 axes orthogonal to each other and the intersection of the 3 axes as a reference. The 3 axes are referred to as X, Y and Z axes whereas the intersection of the 3 axes is the commonly known origin point referred to as a virtual-space origin point in the following description.

In addition, the central processing unit 11 adds a present-position pointer pointing to the present position of the car to the three-dimensional map image. In the following description, the present-position pointer is referred to simply as a position pointer. Then, the central processing unit 11 converts the three-dimensional map image into a two-dimensional map image by projecting the three-dimensional map image onto a two-dimensional plane in order to result in the two-dimensional map image that will be obtained if the viewer sees the three-dimensional map image from a predetermined visual point. The two-dimensional plane takes 2 axes orthogonal to each other and the intersection of the 2 axes as a reference. The 2 axes are referred to as X and Y axes whereas the intersection of the 2 axes is the commonly known origin point also referred to as a plane origin point in the following description. Subsequently, the central processing unit 11 supplies data representing the two-dimensional map image to a display section 20 of a display unit 18 employed in the navigation apparatus 10 by way of a display control circuit 19 also employed in the display unit 18. In this way, the central processing unit 11 sets the width direction of the display screen on the display section 20 as a direction parallel to the x axis of the two-dimensional map image and the visual-point altitude height direction of the display screen on the display section 20 as a direction parallel to the y axis of the two-dimensional map image. The width direction of the display screen on the display section 20 is the visual-point altitude horizontal direction whereas the visual-point altitude height direction of the display screen on the display section 20 is the vertical direction. Then, the two-dimensional map image is displayed on the display screen of the display section 20 in order to allow the user to look at a displayed map and notify the user of the present position of the car in a predetermined area included in the displayed map.

On top of that, the navigation apparatus 10 also employs a traffic-information receiving unit 21 for receiving signals from an external traffic information communication station not shown in the figure through an antenna 22. The traffic-information receiving unit 21 carries out a predetermined signal receiving process such as demodulation processing on the received signals in order to obtain road/traffic information showing road segments in which road disturbances such as traffic jams and accidents have taken place and showing details of the road disturbances, supplying the road/traffic information to the central processing unit 11. In this state, if the central processing unit 11 receives, for example, an input indicating a destination from an operation unit 24 through an input processing circuit 25 and, on the basis of data representing the three-dimensional map and the road/traffic information, the central processing unit 11 searches the map excluding the road segments involved in the road disturbances such as traffic jams and accidents for a route consisting of roads connecting a start position, which is the present position of the car, to the entered destination. The operation unit 24 and the input processing circuit 25 are included in an input unit 23 also employed in the navigation apparatus 10. The operation unit 24 employs a touch panel integrated with the display screen of the display section 20 and operation keys provided on the surface of the cabinet of the navigation apparatus 10. Then, the central processing unit 11 draws the route found in the search process as the roads connecting the start position to the entered destination on the three-dimensional map image in a color different from the color of other roads drawn on the same map. Subsequently, the central processing unit 11 converts the three-dimensional map image into a two-dimensional map image to be displayed on the display screen of the display section 20. By displaying the two-dimensional map image on the display screen of the display section 20, the central processing unit 11 is capable of notifying the user of the roads connecting the start position to the entered destination.

Figure 2:
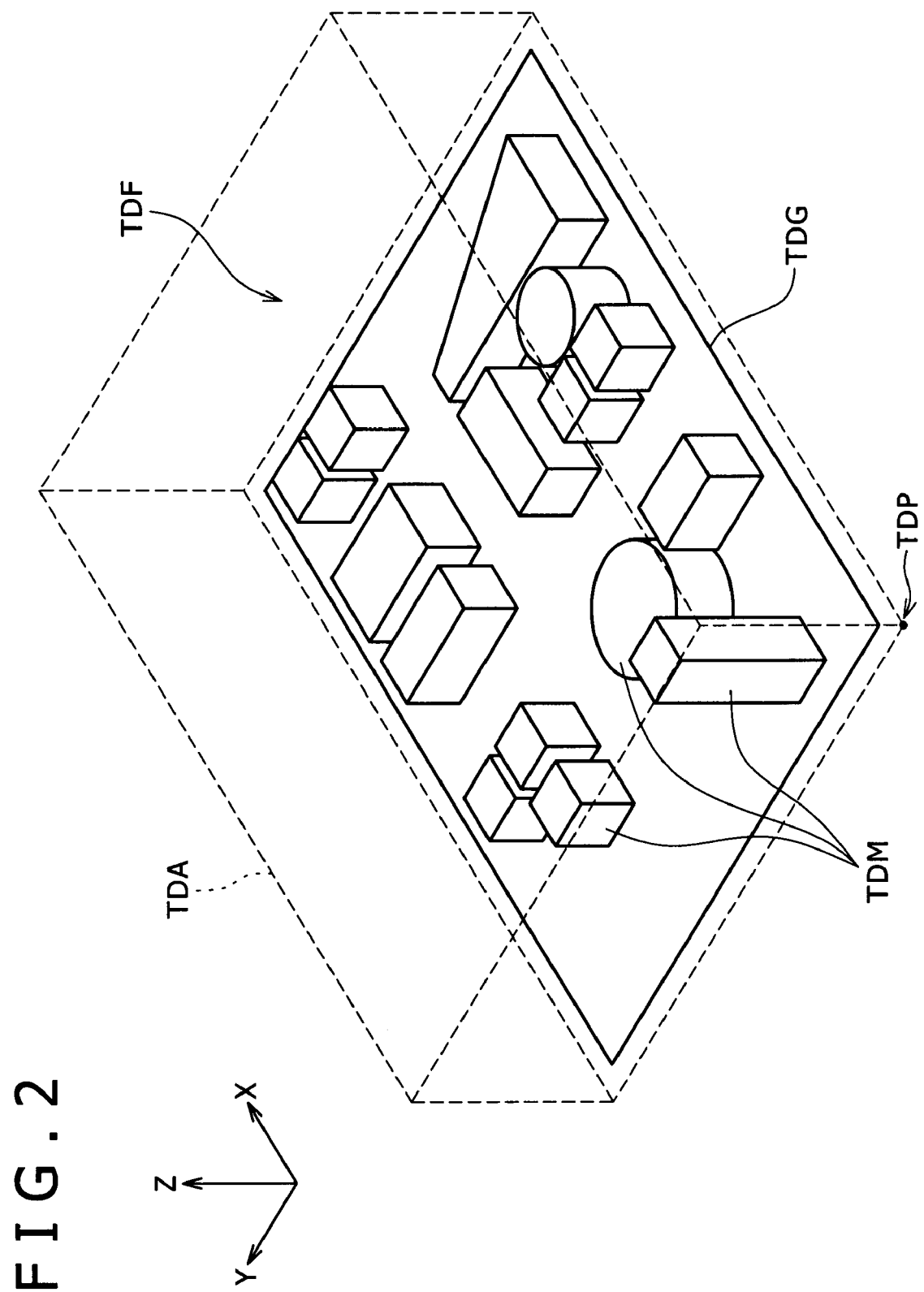
FIG. 2 is a diagram showing a rough configuration of a three-dimensional map image.

By the way, when the navigation apparatus 10 is activated, the central processing unit 11 defines a three-dimensional virtual space TDA taking the 3 X, Y and Z axes as well as the virtual-space origin point TDP as a reference as shown in FIG. 2. To put it in detail, the width, depth and height directions of the three-dimensional virtual space TDA are set as directions parallel to the X, Y and Z axes respectively. Then, the central processing unit 11 converts positional information showing latitudes and longitudes into coordinates in the three-dimensional virtual space TDA. Showing the positions of roads, streets, building and the like, the positional information is obtained on the basis of the three-dimensional map data read out by the central processing unit 11 from the hard-disk drive 17. In the following description, the coordinates in the three-dimensional virtual space TDA are referred to as three-dimensional space coordinates. Subsequently, the central processing unit 11 places a finite two-dimensional plane TDG on the XY plane in the three-dimensional virtual space TDA. Referred to hereafter as a three-dimensional map plane, the finite two-dimensional plane TDG is a plane set in parallel to the XY plane and established typically on the surface of the ground. In addition, the central processing unit 11 places a three-dimensional model TDM based on three-dimensional model data on the three-dimensional map plane TDG in accordance with the three-dimensional space coordinates obtained on the basis of the positional information. The three-dimensional model data is three-dimensional model data included in the three-dimensional map data read out from the hard-disk drive 17. In this way, the central processing unit 11 generates a three-dimensional map image TDF by constructing a stereoscopic map in the three-dimensional virtual space TDA.

Figure 3:
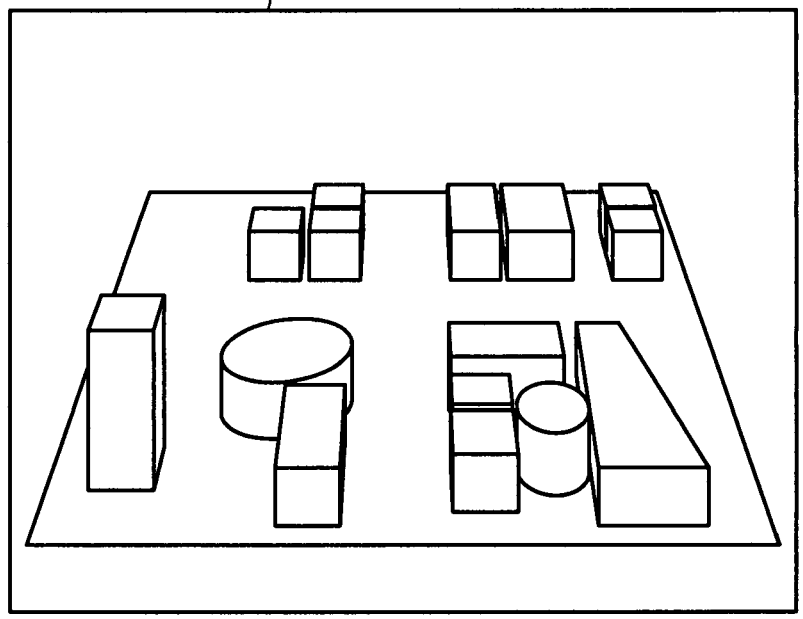
FIG. 3 is a diagram showing a rough configuration of a first two-dimensional slantingly-under long-shot map image.
Figure 4:
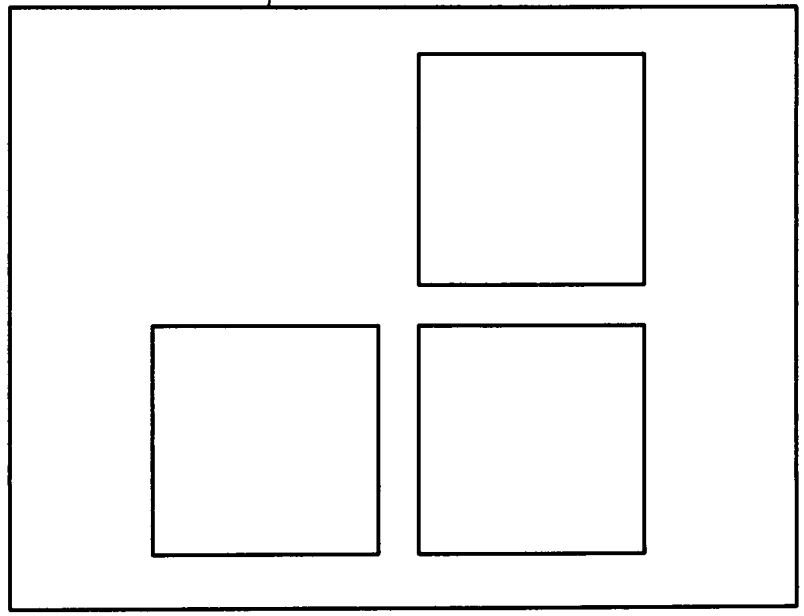
FIG. 4 is a diagram showing a rough configuration of a two-dimensional right-under long-shot map image.

Then, the central processing unit 11 converts the three-dimensional map image TDF into a two-dimensional map image DDF1 like one shown in FIG. 3 by projecting the three-dimensional map image TDF on a two-dimensional plane in order to result in the two-dimensional map image DDF1 that will be obtained if the viewer is looking down the three-dimensional map image TDF in a slanting direction from a visual point existing at a position separated away from the three-dimensional map image TDF in the slanting upward direction, and displays the two-dimensional map image DDF1 on the display screen of the display section 20. That is to say, the result of the projection is obtained if the viewer is looking down the three-dimensional map plane TDG and three-dimensional model TDM of the three-dimensional map image TDF in a slanting direction from a visual point existing at a position separated away from the three-dimensional map image TDF in the slanting upward direction. In the following description, the two-dimensional map image DDF1 obtained as a result of looking down the three-dimensional map image TDF in a slanting direction from a visual point existing at a position separated away from the three-dimensional map image TDF in the slanting upward direction is referred to as a two-dimensional slantingly-under long-shot map image DDF1. Then, if the user arbitrarily specifies a point on the display screen of the display section 20 displaying the two-dimensional slantingly-under long-shot map image DDF1, the central processing unit 11 converts the three-dimensional map image TDF into a two-dimensional map image UDF1 like one shown in FIG. 4 by projecting the three-dimensional map image TDF on the two-dimensional plane in order to result in the two-dimensional map image UDF1 that will be obtained if the viewer is looking down the three-dimensional map image TDF in a vertical direction from a visual point existing at a position right above the three-dimensional map image TDF as a point corresponding to the specified point, and displays the two-dimensional map image UDF1 on the display screen of the display section 20. That is to say, the result of the projection is obtained if the viewer is looking down the three-dimensional map plane TDG and three-dimensional model TDM of the three-dimensional map image TDF in a vertical direction from a visual point existing at a position right above the three-dimensional map image TDF. In the following description, the point specified by the user is referred to as a user-specified point whereas the two-dimensional map image UDF1 obtained as a result of looking down the three-dimensional map image TDF in a vertical direction from a visual point existing at a position right above the three-dimensional map image TDF is referred to as a two-dimensional right-under long-shot map image UDF1.

Figure 5:
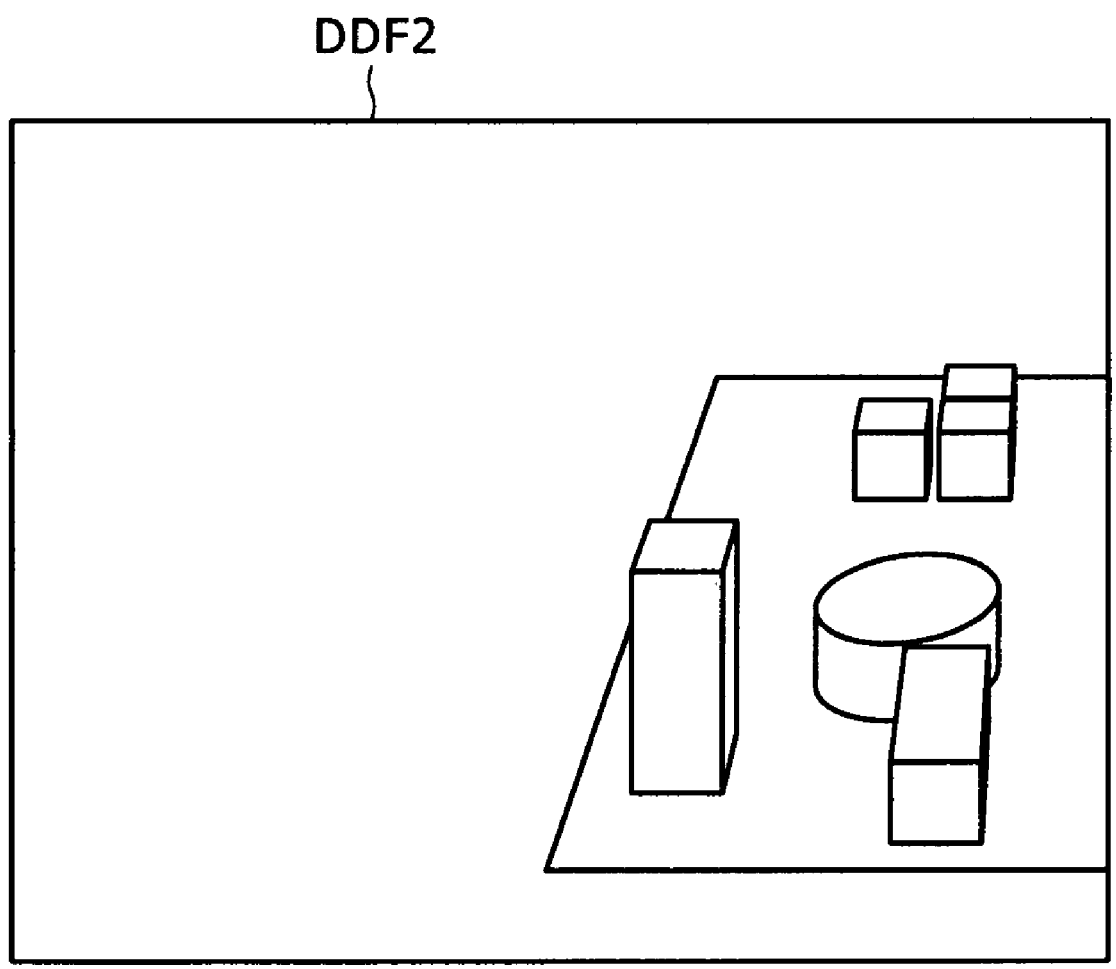
FIG. 5 is a diagram showing a rough configuration of a second two-dimensional slantingly-under long-shot map image.

If the user arbitrarily specifies a point on the display screen of the display section 20 displaying the two-dimensional right-under long-shot map image UDF1, the central processing unit 11 converts the three-dimensional map image TDF into a two-dimensional slantingly-under long-shot map image DDF2 like one shown in FIG. 5 by projecting the three-dimensional map image TDF on a two-dimensional plane in order to result in the two-dimensional slantingly-under long-shot map image DDF2 that will be obtained if the viewer is looking down the three-dimensional map image TDF in a slanting direction from a visual point existing at a position separated away from the three-dimensional map image TDF in the slanting upward direction as a point corresponding to the specified point, and displays the two-dimensional slantingly-under long-shot map image DDF2 on the display screen of the display section 20. As described above, when the navigation apparatus 10 is activated, the central processing unit 11 displays the two-dimensional slantingly-under long-shot map image DDF1 in the so-called slantingly-under long-shot map image display mode. Thereafter, every time the user arbitrarily specifies a point on the display screen of the display section 20 displaying a two-dimensional map image, the central processing unit 11 changes the image display mode from the slantingly-under long-shot map image display mode displaying a two-dimensional slantingly-under long-shot map image to a right-under long-shot map image display mode displaying a two-dimensional right-under long-shot map image or vice versa. The central processing unit 11 changes the image display mode from the slantingly-under long-shot map image display mode displaying the two-dimensional slantingly-under long-shot map image DDF1 to the right-under long-shot map image display mode displaying the two-dimensional right-under long-shot map image UDF1, and then changes the display screen of the display section 20 from the two-dimensional slantingly-under long-shot map image DDF1 to the two-dimensional right-under long-shot map image UDF1. And the central processing unit 11 changes the image display mode from the right-under long-shot map image display mode displaying the two-dimensional right-under long-shot map image UDF1 back to the slantingly-under long-shot map image display mode displaying the two-dimensional slantingly-under long-shot map image DDF2 and then changes the display screen of the display section 20 from the two-dimensional right-under long-shot map image UDF1 to the two-dimensional slantingly-under long-shot map image DDF2.

Figure 6:
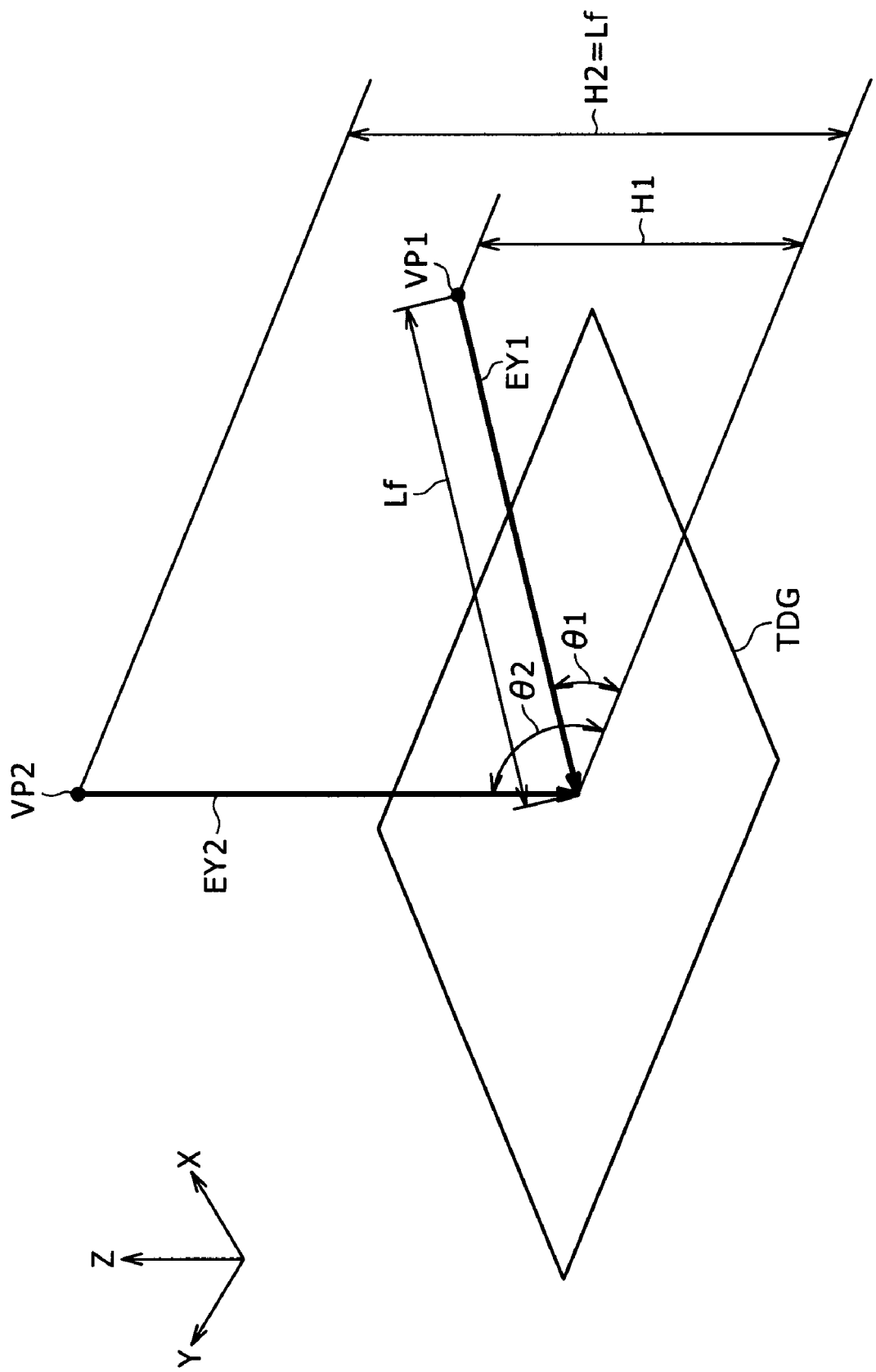
FIG. 6 is a roughly explanatory diagram to be referred to in description of a visual point, the position of which is changed in accordance with an image display mode.

By the way, when the central processing unit 11 generates the two-dimensional slantingly-under long-shot map images DDF1 and DDF2 as well as the two-dimensional right-under long-shot map image UDF1 as described above, on the basis of points specified by the user, the central processing unit 11 sets the positions of visual points VP1 and VP2 to be used in the processes to project the three-dimensional map image TDF on a two-dimensional plane as shown in FIG. 6. In the following description, the position of a visual point is referred to as a visual-point position. With regard to the visual points VP1 and VP2, a focal distance Lf used for adjusting the focus to the three-dimensional map plane TDG of the three-dimensional map image TDF is set at a predetermined distance, which is selected in advance without regard to whether display mode is the right-under long-shot map image display mode or the slantingly-under long-shot map image display mode. In addition, the altitudes H1 and H2 of the visual points VP1 and VP2 respectively are each defined as an altitude from the XY plane of the three-dimensional virtual space TDA. In the following description, the altitudes H1 and H2 of the visual points VP1 and VP2 respectively are each referred to as a visual-point altitude. Thus, the altitudes H1 and H2 of the visual points VP1 and VP2 respectively are selected in advance as described below as the Z components of the three-dimensional space coordinates used for showing the positions of the visual points VP1 and VP2 respectively. On top of that, the angles θ1 and θ2 of visual lines EY1 and EYy2, along which the viewer sees the three-dimensional map plane TDG from the visual points VP1 and VP2, are selected in advance typically by taking the XY plane of the two-dimensional virtual space TDA as a reference. That is to say, a visual line of a visual point is defined as a line connecting the visual point to a focal position on the three-dimensional plane TDG on the XY plane and the angle of a visual line is an angle formed by the visual line and a line obtained as a result of projecting the visual line on the three-dimensional map plane TDG. In the following description, the angle of a visual line is referred to as a visual-line angle.

In actuality, the visual point VP1 used in generation of the two-dimensional slantingly-under long-shot map images DDF1 and DDF2 is a point from which the viewer is looking down the three-dimensional map image TDF in a slanting direction as described above. Thus, the visual-line angle θ1 of the visual line EY1 extended from the visual point VP1 is set as an acute angle selected in advance. On the other hand, the visual point VP2 used in generation of the two-dimensional right-under long-shot map image UDF1 is a point from which the viewer is looking down the three-dimensional map image TDF in a vertical direction as described above. Thus, the visual-line angle θ2 of the visual line EYy2 extended from the visual point VP2 is set as a right angle selected in advance as a right angle with respect to the XY plane of the three-dimensional virtual space TDA. In this case, the XY plane also serves as the three-dimensional map plane TDG. Accordingly, the visual-point altitude H2 of the visual point VP2 used in generation of the two-dimensional right-under long-shot map image UDF1 is set in advance at the focal distance Lf from the visual point VP2 to the three-dimensional map plane TDG. On the other hand, the visual-point altitude H1 of the visual point VP1 used in generation of the two-dimensional slantingly-under long-shot map images DDF1 and DDF2 is set at a predetermined altitude found by computation based on the focal distance Lf and the visual-line angle θ1. Thus, the visual-point altitude H1 is smaller than the visual-point altitude H2 of the visual point VP2 right above the three-dimensional map plane TDG.

However, the two-dimensional slantingly-under long-shot map image DDF1 is initially generated when the navigation apparatus 10 is activated. Thus, a visual point used for generation of the two-dimensional slantingly-under long-shot map image DDF1 is set without making use of a user-specified point specified by the user. In the following description, the visual point used for initially generating the two-dimensional slantingly-under long-shot map image DDF1 is specially referred to as an initially used visual point. Thus, the position of the initially used visual point is selected in advance on the basis of the visual-point altitude H1 and visual-line angle θ1 of the visual point VP1 in such a way that the origin of the visual line arrives from a position outside the three-dimensional map plane TDG at about the center of the three-dimensional map plane TDG (that is, the focus is adjusted to approximately the center of the three-dimensional map plane TDG). In a process carried out by the central processing unit 11 to generate the two-dimensional slantingly-under long-shot map image DDF2 for a user-point specified by the user, on the other hand, a visual point with a visual-point position set on the same side as the initially used visual point with respect to the three-dimensional map plane TDG on the basis of the visual-point altitude H1 and visual-line angle θ1 of the visual point VP1 as well as the user-point specified by the user.

When the central processing unit 11 actually converts the three-dimensional map image TDF into the two-dimensional slantingly-under long-shot map image DDF1 or DDF2 by making use of a visual point separated away from the three-dimensional map image TDF in a slanting upward direction, the central processing unit 11 adjusts the focal distance of the visual point so that a relatively wide range including the three-dimensional map image TDF in the three-dimensional virtual space TDA is projected on the two-dimensional plane. Thus, when the navigation apparatus 10 is activated, for example, the central processing unit 11 draws the whole three-dimensional map image TDF in the two-dimensional slantingly-under long-shot map image DDF1 generated from the three-dimensional map image TDF by using the initially used visual point as shown in FIG. 3. When the user specifies a user-specified point, on the other hand, the central processing unit 11 converts the three-dimensional map image TDF into the two-dimensional slantingly-under long-shot map image DDF2 as shown for example in FIG. 5, by projecting the three-dimensional map image TDF on a two-dimensional plane in order to result in the two-dimensional slantingly-under long-shot map image DDF2 that will be obtained if the viewer is looking down at least a part of the three-dimensional map image TDF in a slanting direction from a visual point existing at a position separated away from the three-dimensional map image TDF in the slanting upward direction as a point corresponding to the specified point. That is to say, the central processing unit 11 draws at least the part of the three-dimensional map image TDF in the two-dimensional slantingly-under long-shot map image DDF2 as if the three-dimensional map image TDF in the two-dimensional slantingly-under long-shot map image DDF1 generated by making use the initially used visual point had been moved and shows the part of the three-dimensional map image TDF in the two-dimensional slantingly-under long-shot map image DDF2 to the user.

When the central processing unit 11 generates the two-dimensional right-under long-shot map image UDF1 in accordance with a user-specified point specified by the user, on the other hand, the central processing unit 11 makes use of a visual point set at a visual-point position on the basis of the visual-point altitude H2 and visual-line angle θ2 of the visual point VP2 as well as the user-specified point. In the case of such a visual point existing at a position right above the three-dimensional map image TDF, however, when the central processing unit 11 actually converts the three-dimensional map image TDF into the two-dimensional right-under long-shot map image UDF1, the central processing unit 11 adjusts the focal distance of the visual point so that a part of the three-dimensional map image TDF is projected onto a two-dimensional plane. Thus, when the central processing unit 11 makes use of a visual point existing at a position right above the three-dimensional map plane TDG in generation of the two-dimensional right-under long-shot map image UDF1, the central processing unit 11 sets an area on the three-dimensional map plane TDG of the three-dimensional map image TDF by taking the visual line of the visual point as a center. The area is as an area to be actually projected on the two-dimensional plane with its size enlarged in accordance with the focal distance. In the following description, this area is referred to as an enlarged area. Then, the central processing unit 11 converts the three-dimensional map image TDF into the two-dimensional right-under long-shot map image UDF1 by projecting the enlarged area on the three-dimensional map plane TDG of the three-dimensional map image TDF onto the two-dimensional plane in order to result in the two-dimensional right-under long-shot map image UDF1 that will be obtained if the viewer is looking down the area from the visual point existing at a position right above the three-dimensional map plane TDG. Thus, when the central processing unit 11 generates the two-dimensional right-under long-shot map image UDF1 like the one shown in FIG. 4 by making use of the visual point existing at a position right above the three-dimensional map plane TDG of the three-dimensional map image TDF, the central processing unit 11 draws the enlarged area of the three-dimensional map image TDF looked down from the visual point in the vertical direction by enlarging its size in the two-dimensional right-under long-shot map image UDF1 so that details of the enlarged area can be shown to the user.

Figure 7:
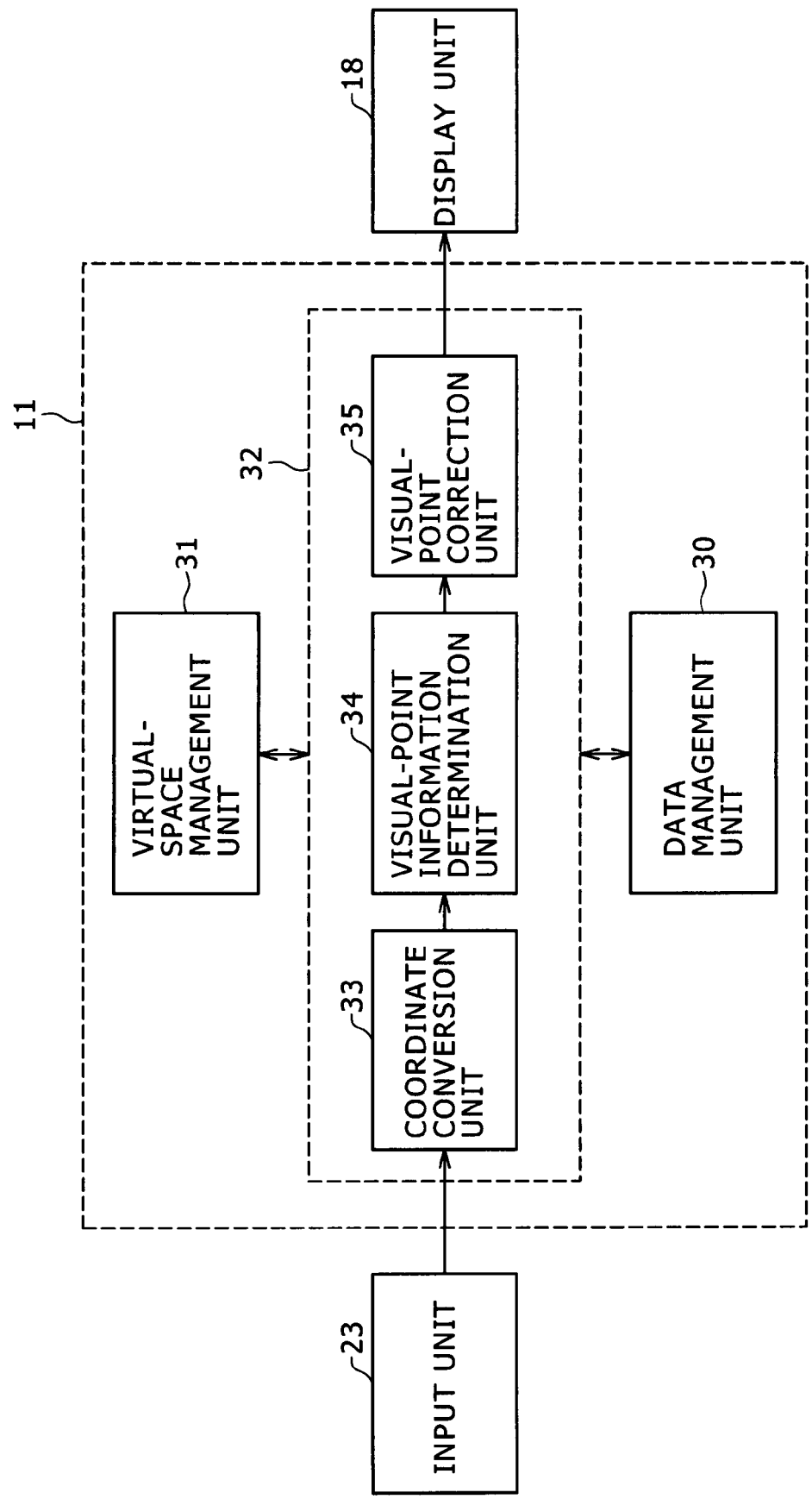
FIG. 7 is a roughly explanatory diagram to be referred to in describing the implementation of display control functions by making use of a central processing unit.

As described above, the central processing unit 11 carries out a display control function by execution of a display control program to generate the three-dimensional map image TDF, convert the three-dimensional map image TDF into the two-dimensional slantingly-under long-shot map image DDF1, the two-dimensional slantingly-under long-shot map image DDF2 or the two-dimensional right-under long-shot map image UDF1 and display the two-dimensional slantingly-under long-shot map image DDF1, the two-dimensional slantingly-under long-shot map image DDF2 or the two-dimensional right-under long-shot map image UDF1 on the display screen 20. Thus, for the sake of convenience, the display control function carried out by the central processing unit 11 by execution of the display control program is explained below in detail as processing carried out by functional blocks implemented by pieces of hardware as shown in FIG. 7. To begin with, a data management unit 30 of the functional blocks is a unit for managing three-dimensional model data included in three-dimensional map data read out from the hard-disk drive 17.

A virtual-space management unit 31 of the functional blocks is a unit for carrying out an initialization process when the navigation apparatus 10 is activated. In this initialization process, the virtual-space management unit 31 converts positional information obtained from the three-dimensional map data read out from the hard-disk drive 17 as information showing altitudes and longitudes into two-dimensional space coordinates in the three-dimensional virtual space TDA. Then, in the initialization process, as explained earlier by referring to FIG. 2, the virtual-space management unit 31 defines the three-dimensional virtual space TDA, places the three-dimensional map plane TDG on the XY plane of the three-dimensional virtual space TDA, places the three-dimensional model TDM on the three-dimensional map plane TDG in accordance with the two-dimensional space coordinates generated on the basis of the positional information and generates the three-dimensional map image TDF.

In addition, in the initialization process, the virtual-space management unit 31 sets two mutually orthogonal x and y axes on a two-dimensional plane and the intersection of the x and y axes as an origin point for the display screen of the display section 20, and applies the setting to the two-dimensional slantingly-under long-shot map image DDF1, the two-dimensional slantingly-under long-shot map image DDF2 and the two-dimensional right-under long-shot map image UDF1, which each appear on the display screen. By the way, as a coordinate system set for the display screen, the virtual-space management unit 31 adopts the so-called left-hand system coordinate space typically taking the right direction of the display screen as the x axis, taking the upward direction of the display screen as the y axis and taking the depth direction of the display screen as the z axis. Thus, when the user arbitrarily specifies a user-specified point on the display screen of the display section 20 displaying the two-dimensional slantingly-under long-shot map image DDF1, the two-dimensional slantingly-under long-shot map image DDF2 or the two-dimensional right-under long-shot map image UDF1 by touching a display panel employed in the operation unit 24, the virtual-space management unit 31 is capable of detecting the coordinates of the user-specified point position of the user-specified point. In the following description, the coordinates are referred to as two-dimensional plane coordinates. In addition, the virtual-space management unit 31 is also capable of recognizing the two-dimensional plane coordinates of the user-specified point position of the user-specified point as the two-dimensional plane coordinates of a point existing on the two-dimensional slantingly-under long-shot map image DDF1, the two-dimensional slantingly-under long-shot map image DDF2 or the two-dimensional right-under long-shot map image UDF1 as a point facing the user-specified point. That is to say, the point existing on the two-dimensional slantingly-under long-shot map image DDF1, the two-dimensional slantingly-under long-shot map image DDF2 or the two-dimensional right-under long-shot map image UDF1 as a point facing the user-specified point is a point specified by the user by touching a display panel employed in the operation unit 24.

In addition, the virtual-space management unit 31 also holds and manages information on the initially used visual point. The information on the initially used visual point is information showing the position of the initially used visual point used in a process to convert the three-dimensional map image TDF into the two-dimensional slantingly-under long-shot map image DDF1. On top of that, the virtual-space management unit 31 also holds and manages information on visual points used in a process to convert the three-dimensional map image TDF into the two-dimensional slantingly-under long-shot map image DDF2 and a process to convert the three-dimensional map image TDF into the two-dimensional right-under long-shot map image UDF1. The information on visual points includes the focal distance Lf, the visual-points altitudes H1 and H2 and the visual-line angles θ1 and θ2.

A display-contents determination unit 32 of the functional blocks shown in FIG. 7 employs a coordinate conversion unit 33, a visual-point information determination unit 34 and a visual-point correction unit 35. When the user arbitrarily specifies a user-specified point on the display screen of the display section 20 by operating the input unit 23 employing the input processing circuit 25 and a touch panel serving as the operation unit 24, the coordinate conversion unit 33 detects the operation carried out by the user to specify the user-specified point, recognizes the two-dimensional plane coordinate values (x1, y1) of the user-specified point and retrieves the two-dimensional plane coordinate values (x1, y1). Then, the coordinate conversion unit 33 converts the user-specified point as a point existing on the two-dimensional slantingly-under long-shot map image DDF1, the two-dimensional slantingly-under long-shot map image DDF2 or the two-dimensional right-under long-shot map image UDF1 into a point existing on the three-dimensional map plane TDG of the three-dimensional map image TDF as described below. In the following description, the point existing on the three-dimensional map plane TDG of the three-dimensional map image TDF is referred to as a specified-point corresponding point mentioned before. In actuality, the three-dimensional map plane TDG serving as a plane on which the user-specified point is projected is placed on the XY plane of the three-dimensional virtual space TDA. Thus, the coordinate conversion unit 33 projects the user-specified point onto a point existing on the XY plane in the three-dimensional virtual space TDA as a point corresponding to the user-specified point by handling the two-dimensional plane coordinate values (x1, y1) of the user-specified point as a vector (x1, y1, 0) and, then, converts the two-dimensional plane coordinate values (x1, y1) of the user-specified point into three-dimensional plane coordinate values (X1, Y1, Z1) of the point existing on the XY plane in the three-dimensional virtual space TDA. In the following description, the point existing on the XY plane in the three-dimensional virtual space TDA is referred to as a projection point.

However, the three-dimensional map plane TDG of the three-dimensional map image TDF is a finite plane, which is narrower than the XY plane in the three-dimensional virtual space TDA. Thus, when the user specifies a user-specified point on the display screen of the display section 20 in the two-dimensional slantingly-under long-shot map image display mode in which the display section 20 displays the two-dimensional slantingly-under long-shot map image DDF1 or the two-dimensional slantingly-under long-shot map image DDF2, in some cases, the projection point existing on the XY plane of the three-dimensional virtual space TDA as a point corresponding to the user-specified point may be outside the three-dimensional map plane TDG. For this reason, when the coordinate conversion unit 33 produces the three-dimensional space coordinate values (X1, Y1, Z1) of the projection point existing on the XY plane, the coordinate conversion unit 33 compares the three-dimensional space coordinate values (X1, Y1, Z1) with the three-dimensional space coordinates values showing the location of the three-dimensional map plane TDG in order to produce a result of determination as to whether or not the projection point exists on the three-dimensional map plane TDG. If the result of the determination indicates that the projection point exists on the three-dimensional map plane TDG, the coordinate conversion unit 33 takes the projection point as a specified-point corresponding point, hence, taking the three-dimensional space coordinate values (X1, Y1, Z1) of the projection point as the three-dimensional space coordinate values of the specified-point corresponding point. Then, the coordinate conversion unit 33 takes the two-dimensional plane coordinate values (x1, y1) of a point, which has been specified by the user as the user-specified point on the display screen of the display section 20, as they are as the two-dimensional plane coordinate values of the user-specified point confirmed as a point indicating a visual-point position specified by the user to change a visual point. In the following description, the user-specified point confirmed as a point indicating a visual-point position specified by the user is referred to as a confirmed user-specified position. Referred to hereafter as specified-point two-dimensional plane coordinate values, the two-dimensional plane coordinate values of the confirmed user-specified point is also the two-dimensional plane coordinate values of the user-specified point on the two-dimensional slantingly-under long-shot map image DDF1, the two-dimensional slantingly-under long-shot map image DDF2 or the two-dimensional right-under long-shot map image UDF1.

Figure 8:
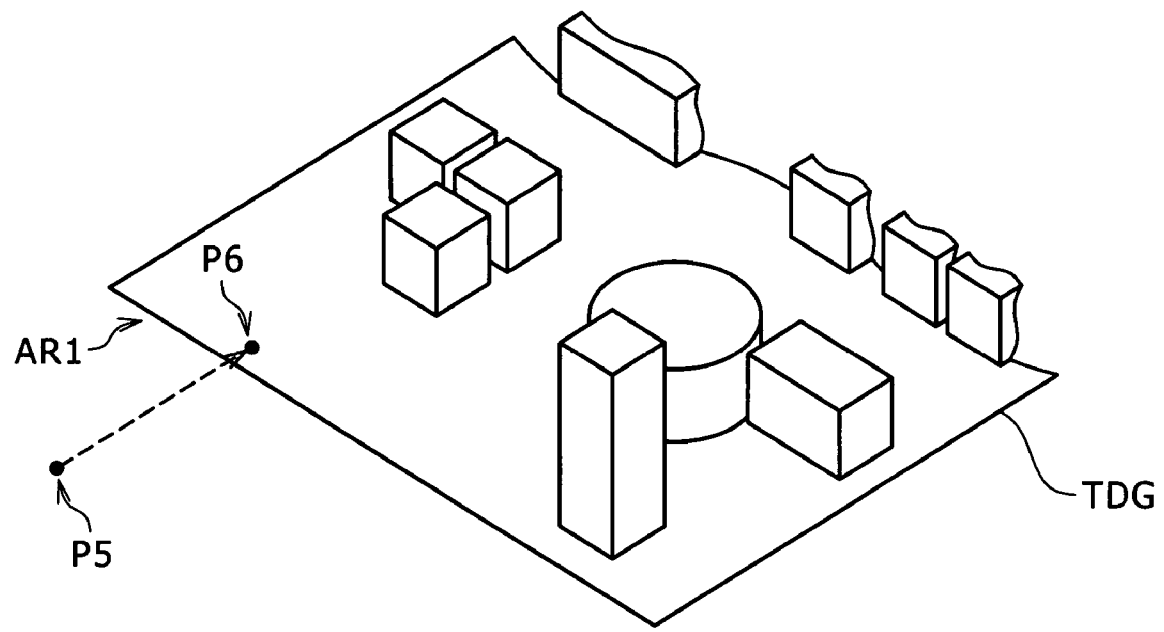
FIG. 8 is a roughly explanatory diagram to be referred to in description of a process to change the position of a projection point to the position of a point corresponding to a point specified by the user.

If the result of the determination indicates that the projection point exists at a location outside the three-dimensional map plane TDG as is the case with a projection point P5 shown in FIG. 8, on the other hand, the coordinate conversion unit 33 moves the projection point P5 to, for example, a position on the inner side of a side AR1 pertaining the three-dimensional map plane TDG as a side closest to the projection point P5, being changed to an specified-point corresponding point P6, and detects the three-dimensional space coordinate values (X2, Yy2, Z2) of the specified-point corresponding point P6 at the position to which the projection point P5 is moved. Then, the coordinate conversion unit 33 converts the three-dimensional space coordinate values (X2, Yy2, Z2) of the specified-point corresponding point P6 into two-dimensional plane coordinate values (x2, y2) of a point on the display screen and takes the two-dimensional plane coordinate values (x2, y2) as the specified-point two-dimensional plane coordinate values of a confirmed user-specified point confirmed as a point indicating the visual-point position specified by the user to change a visual point. As described above, when the user arbitrarily specifies a user-specified point on the display screen of the display section 20, the coordinate conversion unit 33 takes the user-specified point as a point corresponding to the specified-point corresponding point P6 on the three-dimensional map plane TDG provided on the three-dimensional map image TDF and detects the specified-point two-dimensional plane coordinate values (x1, y1) as well as (x2, y2). By the way, the Z coordinate values Z1 and Z2 of the specified-point corresponding point P6 are each 0 since the specified-point corresponding point P6 exists on the three-dimensional map plane TDG placed on the XY plane of the three-dimensional virtual space TDA.

After the coordinate conversion unit 33 detects the specified-point two-dimensional plane coordinate values (x1, y1) and (x2, y2), the visual-point information determination unit 34 produces a result of determination as to whether the image display mode is the two-dimensional slantingly-under long-shot map image display mode or the two-dimensional right-under long-shot map image display mode. If the determination result produced by the visual-point information determination unit 34 indicates that the image display mode is the two-dimensional slantingly-under long-shot map image display mode, the visual-point information determination unit 34 determines that the visual-point altitude H2 and the visual line angle θ2, which are used when the viewer looks down the three-dimensional map image TDF in the vertical direction, be taken respectively as the visual-point altitude and visual-line angle of a visual point set as a target visual point to be used in a process to newly generate the two-dimensional right-under long-shot map image UDF1 in accordance with the operation to specify the confirmed user-specified point. In the following description, the visual point set as a target visual point is referred to as a set target visual point, the altitude of the set target visual point is referred to as a set target visual-point altitude, the visual-line angle of the set target visual point is referred to as a set target visual-line angle. Then, for the visual-point position of the set target visual point, the visual-point information determination unit 34 adjusts the focus to the specified-point corresponding point. In the following description, the visual-point position of the set target visual point is referred to a set target visual-point position. Subsequently, the visual-point information determination unit 34 takes the set target visual-point altitude as a new visual-point altitude H2 and the set target visual-line angle as a new visual line angle θ2. On top of that, for the visual-point position of a visual point serving as a set reference of the set target visual point, the visual-point information determination unit 34 also adjusts the focus to the specified-point corresponding point. In the following description, the visual point serving as a set reference of the set target visual point is referred to as a set reference visual point whereas the visual-point position of the set reference visual point is referred to as a set reference visual-point position. In addition, the visual-point information determination unit 34 takes the altitude of the set reference visual point as the focal distance Lf and sets the angle of the visual line of the set reference visual point as a visual-line angle used in generation either of the two-dimensional slantingly-under long-shot map image DDF1 and the two-dimensional slantingly-under long-shot map image DDF2, which is displayed on the display screen of the display section 20 at this point of time. In the following description, the altitude of the set reference visual point is referred to as a set reference visual-point altitude whereas the angle of the visual line of the set reference visual point is referred to as a set reference visual-line angle.

On top of that, the visual-point information determination unit 34 sets a visual point between the set reference visual point and the set target visual point by interpolation. In the following description, this visual point set by interpolation between the set reference visual point and the set target visual point is referred to as an interpolated visual point. To put it in detail, the visual-point information determination unit 34 typically carries out a linear interpolation process on the set reference visual-point altitude of the set reference visual point and the set target visual-point altitude of the set target visual point in order to sequentially compute an interpolated visual-point altitude. The interpolated visual-point altitude is defined as a visual-point altitude, which is an interpolated value for changing the set reference visual-point altitude to the set target visual-point altitude little by little. Thus, by carrying out the linear interpolation process, the visual-point information determination unit 34 moves the set reference visual point in a direction parallel to the Y axis in the three-dimensional virtual space TDA. In addition, the visual-point information determination unit 34 typically carries out a spherical linear interpolation process on the set reference visual-line angle of the set reference visual point and the set target visual-line angle of the set target visual point in order to sequentially compute an interpolated visual-line angle. The interpolated visual-line angle is defined as a visual-line angle, which is an interpolated value for changing the set reference visual-line angle to the set target visual-line angle little by little. Thus, by carrying out the spherical linear interpolation process, the visual-point information determination unit 34 moves the set reference visual point in a direction parallel to the Y axis in the three-dimensional virtual space TDA. Then, the visual-point information determination unit 34 takes the visual-point position of the interpolated point set between the set reference visual point and the set target visual point as the focus position of the specified-point corresponding point. In the following description, the visual-point position of the interpolated point is referred to as the interpolated visual-point position. In addition, the visual-point information determination unit 34 takes the visual-point altitude of the interpolated visual point and the visual-line angle of the interpolated visual point as respectively an interpolated visual-point altitude and an interpolated visual-line angle, which together form a pair of values.

If the determination result produced by the visual-point information determination unit 34 indicates that the image display mode is the two-dimensional right-under long-shot map image display mode, on the other hand, the visual-point information determination unit 34 determines that the visual-point altitude H1 and the visual line angle θ1, which are used when the viewer looks down the three-dimensional map image TDF in the slanting direction, be taken respectively as the set target visual-point altitude and set target visual-line angle of a set target visual point to be used in a process to generate the two-dimensional slantingly-under long-shot map image DDF2 in accordance with the operation to specify the confirmed user-specified point. Then, for the set target visual-point position of the set target visual point, the visual-point information determination unit 34 adjusts the focus to the specified-point corresponding point. Subsequently, the visual-point information determination unit 34 takes the set target visual-point altitude as a new visual-point altitude H1 and the set target visual-line angle as a new visual line angle θ1. On top of that, for the set reference visual-point position of the set target visual point, the visual-point information determination unit 34 also adjusts the focus to the specified-point corresponding point. In addition, the visual-point information determination unit 34 takes the set reference visual-point altitude as the focal distance Lf and sets the set reference visual-line angle as a visual-line angle used in generation of the two-dimensional right-under long-shot map image UDF1 displayed on the display screen of the display section 20 at this point of time. On top of that, also in this case, much like the two-dimensional slantingly-under long-shot map image display mode described above, the visual-point information determination unit 34 sets an interpolated visual point between the set reference visual point and the set target visual point by interpolation.

By the way, when the navigation apparatus 10 is activated, in order to generate the two-dimensional slantingly-under long-shot map image DDF1 initially, the visual-point information determination unit 34 determines to make use of initially used visual-point information, which is information on the initially used visual point. In this way, each time the user arbitrarily specifies a user-specified point, the visual-point information determination unit 34 determines visual-point information to be used in generation of the two-dimensional slantingly-under long-shot map image DDF2 or the two-dimensional right-under long-shot map image UDF1 in accordance with the operation to specify the user-specified point. Then, on the basis of the visual-point information, the visual-point information determination unit 34 determines the set target visual-point position of the set target visual point, the set reference visual-point position of the set reference visual point and the interpolated visual-point position of the interpolated visual point.

A visual-point correction unit 35 projects the specified-point two-dimensional plane coordinate values (x1, y1) detected by the coordinate conversion unit 33 onto the XY plane in the three-dimensional virtual space TDA as a vector (x1, y1, 0) in order to convert the specified-point two-dimensional plane coordinate values (x1, y1) into the three-dimensional space coordinate values (x1, Y1, Z1) of the specified-point corresponding point on the three-dimensional map plane TDG, or projects the specified-point two-dimensional plane coordinate values (x2, y2) detected by the coordinate conversion unit 33 onto the XY plane in the three-dimensional virtual space TDA as a vector (x2, y2, 0) in order to convert the specified-point two-dimensional plane coordinate values (x2, y2) into the three-dimensional space coordinate values (X2, Yy2, Z2) of the specified-point corresponding point. Then, the visual-point correction unit 35 substitutes the Z coordinate value Z1 (or Z2) for an element located at the intersection of the $4^{th}$ row and the $3^{rd}$ column in a 4-row and 4-column unit matrix S expressed by Eq. (1) to give a 4-row and 4-column matrix M expressed by Eq. (2).

$$S = \begin{bmatrix} 1.00 & 0.00 & 0.00 & 0.00 \\ 0.00 & 1.00 & 0.00 & 0.00 \\ 0.00 & 0.00 & 1.00 & 0.00 \\ 0.00 & 0.00 & 0.00 & 1.00 \end{bmatrix} \quad (1)$$

$$M = \begin{bmatrix} 1.00 & 0.00 & 0.00 & 0.00 \\ 0.00 & 1.00 & 0.00 & 0.00 \\ 0.00 & 0.00 & 1.00 & 0.00 \\ 0.00 & 0.00 & Z1 & 1.00 \end{bmatrix} \quad (2)$$

The 4-row and 4-column unit matrix S is a homogenous coordinate expression matrix in which the element located at the intersection of the $4^{th}$ row and the $3^{rd}$ column is a component of three-dimensional space coordinate values representing a parallel movement. The component of three-dimensional space coordinate values representing a parallel movement is the Z coordinate value.

To be more specific, the Z coordinate value Z1 (or Z2) is a component of three-dimensional space coordinate values representing a parallel movement taking the three-dimensional map plane TDG as a reference. Thus, in order to make it possible to carry out all vector processing in a homogeneous coordinate system in a process of sequentially changing the visual-point altitude and the visual-line angle in accordance with an operation to specify a user-specified point, the visual-point correction unit 35 finds the matrix M for carrying out a parallel movement conversion process on vectors used in the vector processing as a parallel movement or conversion to the three-dimensional map plane TDG of the three-dimensional map image TDF. In the following description, the matrix M is referred to as a parallel movement conversion matrix. It is to be noted, however, that the three-dimensional map plane TDG is placed on the XY plane in the three-dimensional virtual space TDA. Thus, since the Z coordinate value Z1 (or Z2) of the three-dimensional space coordinates representing the position of the specified-point corresponding point is 0, the unit matrix S expressed by Eq. (1) can be used as it is as the parallel movement conversion matrix M taking the three-dimensional map plane TDG as a reference.

The visual-point correction unit 35 adds the focal distance Lf as a Z coordinate value to the specified-point two-dimensional plane coordinate values (x1, y1) in order to generate a visual-line direction vector (x1, y1, Lf) of the set reference visual point with its focus adjusted to a specified-point corresponding point located on the three-dimensional map plane TDG as a point corresponding to the specified-point two-dimensional plane coordinate values (x1, y1). By the same token, the visual-point correction unit 35 may add the focal distance Lf as a Z coordinate value to the specified-point two-dimensional plane coordinate values (x2, y2) in order to generate a visual-line direction vector (x2, y2, Lf) of the set reference visual point with its focus adjusted to a specified-point corresponding point located on the three-dimensional map plane TDG as a point corresponding to the specified-point two-dimensional plane coordinate values (x2, y2). Then, the visual-point correction unit 35 generates a view matrix MV expressed by Eq. (3) given below.

$$MV = \begin{bmatrix} a11 & a12 & a13 & a14 \\ a21 & a22 & a23 & a24 \\ a31 & a32 & a33 & a34 \\ a41 & a42 & a43 & a44 \end{bmatrix} \quad (3)$$

In this case, the visual-point correction unit 35 generates a parallel movement component t representing a movement of the visual-line direction vector (x1, y1, Lf) of the set reference visual point as a movement parallel to the Y axis in the three-dimensional virtual space TDA on the basis of the interpolated visual-point altitude, the interpolated visual-line angle, the set target visual-point altitude and the set target visual-line angle, which have been found by the visual-point information determination unit 34. To put it in detail, the parallel movement component t is a parallel movement component representing the interpolated visual-point altitude and the interpolated visual-line angle or the set target visual-point altitude and the set target visual-line angle by which the set reference visual point is moved in parallel to the Y axis in the three-dimensional virtual space TDA. The parallel movement component t is expressed in terms of an X coordinate value, a Y coordinate value and a Z coordinate value, which are set as the elements a41, a42 and a43 of the view matrix MV. As is obvious from Eq. (3), the elements a41, a42 and a43 of the view matrix MV are elements at the intersections of the fourth row and the first, second and third columns respectively.

Then, the visual-point correction unit 35 finds the absolute value of the visual-line direction vector (x1, y1, Lf) by making use of the view matrix MV. In this way, the visual-point correction unit 35 converts the visual-line direction vector (x1, y1, Lf) of the set reference visual point in the three-dimensional virtual space TDA into a visual-line direction vector v of an interpolated visual point obtained as a result of a movement parallel to the Y axis by a distance equivalent to the parallel movement component t with the focus adjusted to the specified-point corresponding point on the three-dimensional map plane TDG as it is. If the visual-point correction unit 35 sets an interpolated visual point by making use of the visual-line direction vector v found in this way as it is, however, the focus position of the interpolated visual point will coincide with the specified-point corresponding point on the three-dimensional map plane TDG. Thus, much like the map display apparatus in the past, a two-dimensional map image taking the specified-point corresponding point as its center point will be displayed on the display screen of the display section 20 with the image center point adjusted to the center point of the screen.

Therefore, the visual-point correction unit 35 makes use of the parallel movement conversion matrix M to find relative values of the absolute visual-line direction vector v. The vector obtained as a result of finding relative values of the absolute visual-line direction vector v is referred to as a relative visual-line direction vector V. By the way, since the parallel movement conversion matrix M is the unit matrix S itself, the values of the relative visual-line direction vector V are the same as the values of the absolute visual-line direction vector v. Let us assume for example that the values of the relative visual-line direction vector V are (X11, Y11, Z11). In addition, since the relative visual-line direction vector V and the absolute visual-line direction vector v are each subjected to a parallel movement along the Y axis in the three-dimensional virtual space TDA, the X coordinate value X11 of the relative visual-line direction vector V is equal to the x coordinate value x1 of the coordinate values (x1, y1, Lf) of the absolute visual-line direction vector v. Then, the visual-point correction unit 35 makes use of the parallel movement conversion matrix M to find the relative value of a parallel movement component t of the parallel movement conversion matrix MV. As described earlier, the parallel movement component t consists of elements a41, a42 and a43 of the parallel movement conversion matrix MV. That is to say, the visual-point correction unit 35 finds the relative value of the parallel movement component t with respect to a parallel movement component taking the three-dimensional map plane TDG as a reference. Let us assume that notation T denotes the relative value of the parallel movement component t. In the following description, the relative value of the parallel movement component t is referred to as a relative parallel movement component T. Since the parallel movement conversion matrix M is the unit matrix S itself, the relative parallel movement component T is equal to the original parallel movement component t. The parallel movement conversion matrix M is the unit matrix S itself because the three-dimensional map plane TDG is placed on the XY plane of the three-dimensional virtual space TDA and the parallel movement component taking the three-dimensional map plane TDG as a reference is 0.

Then, the visual-point correction unit 35 makes use of the parallel movement conversion matrix M also to find relative values Q of the three-dimensional space coordinate values (X1, Y1, Z1) of the specified-point corresponding point corresponding to the specified-point two-dimensional plane coordinate values (x1, y1) or find relative values Q of the three-dimensional space coordinate values (X2, Yy2, z2) of the specified-point corresponding point corresponding to the specified-point two-dimensional plane coordinate values (x2, y2). By the way, since the parallel movement conversion matrix M is the unit matrix S itself, the relative values Q of the three-dimensional space coordinate values (X1,Y1, Z1) or (X2, Yy2, Z2) are equal to the original three-dimensional space coordinate values (X1,Y1, Z1) or (X2,Yy2, Z2) respectively. In the following description, the relative values Q of the three-dimensional space coordinate values are referred to as a relative three-dimensional space coordinate vector Q. As described above, the visual-point correction unit 35 converts the absolute visual-line direction vector v of the set reference visual point shifted in a parallel movement by a distance equivalent to the parallel movement component t of the parallel movement conversion matrix MV, the parallel movement component t and the three-dimensional space coordinate values (X1, Y1, Z1) or (x2, Yy2, Z2) of the specified-point corresponding point into the relative visual-line direction vector V taking the three-dimensional map plane TDG as a reference, the relative parallel movement vector T and the relative three-dimensional space coordinate vector Q respectively. In this way, the visual-point correction unit 35 is capable of handling the relative visual-line direction vector V, the relative parallel movement vector T and the relative three-dimensional space coordinate vector Q in an integrated manner.

In this state, the visual-point correction unit 35 computes a corrected relative parallel movement vector Th in accordance with Eq. (4) given as follows:

$$Th = Q + V(Tz/Vz) \qquad 4$$

In the above equation, notation Tz denotes the Z coordinate value of the relative parallel movement vector T whereas notation Vz denotes the Z coordinate value of the relative visual-line direction vector V. As is obvious from the equation, the ratio of Tz to Vz is multiplied by the relative visual-line direction vector V to give a product to be added to the relative three-dimensional space coordinate vector Q in order to result in the corrected relative parallel movement vector Th, which is a corrected relative parallel movement vector T of the parallel movement conversion matrix MV. Thus, in order to make the specified-point corresponding point on the three-dimensional map plane TDG face the confirmed user-specified point on the display screen, the visual-point correction unit 35 changes the visual-line vector (x1, y1, Lf) of the specified-point corresponding point on the three-dimensional map plane TDG without changing the visual-line angle but merely shifted the focus position once from the specified-point corresponding point. That is to say, the visual-point correction unit 35 changes the visual-line vector (x1, y1, Lf) by merely shifting the focus position once from the specified-point corresponding point. Then, the visual-point correction unit 35 obtains the corrected relative parallel movement vector Th for the movement parallel to the Y axis in the three-dimensional virtual space TDA. Subsequently, the visual-point correction unit 35 makes use of the parallel movement conversion matrix M also to find the absolute value of the corrected relative parallel movement vector Th in order to convert the corrected relative parallel movement vector Th into a corrected parallel movement component of the three-dimensional space coordinate system. Since the parallel movement conversion matrix M is the unit matrix S itself, the corrected parallel movement component of the three-dimensional space coordinate system is equal to the original corrected relative parallel movement vector Th. In addition, since the focus position of the set reference visual point is shifted from the specified-point corresponding point on the three-dimensional map plane TDG, the Z coordinate value of the corrected parallel movement component of the three-dimensional space coordinate system is equal to the Z coordinate value of the parallel movement component t of the view matrix MV because the altitude of the interpolated visual point is not changed even though the X and Y coordinate values of the corrected parallel movement component of the three-dimensional space coordinate system are different from the X and Y coordinate values of the parallel movement conversion matrix MV.

After the visual-point correction unit 35 generates the corrected parallel movement component as described above, the parallel movement component t of the parallel movement conversion matrix MV expressed by Eq. (3) is changed to the corrected parallel movement component. As described above, the parallel movement component t of the parallel movement conversion matrix MV is a41, a42 and a43, which are the elements located in the parallel movement conversion matrix MV at the intersections of the $4^{th}$ row and the first, second and third columns respectively. Then, the visual-point correction unit 35 makes use of a view matrix obtained as a result of changing the parallel movement component t of the parallel movement conversion matrix MV to the corrected parallel movement component to again find the absolute values of the visual-line direction vector (x1, y1, Lf). In the following description, the view matrix obtained as a result of changing the parallel movement component t of the parallel movement conversion matrix MV to the corrected parallel movement component is referred to as a corrected view matrix. Thus, after adjusting the focus to a point different from the specified-point corresponding point on the three-dimensional map plane TDG, the visual-point correction unit 35 moves the visual-line direction vector (x1, y1, Lf) of the set reference visual point in a direction parallel to the Y axis in the three-dimensional virtual space TDA by a distance equivalent to the corrected parallel movement component in order to convert the visual-line direction vector (x1, y1, Lf) into the corrected absolute visual-line direction vector.

Thus, in accordance with the visual-point altitude and visual-line angle of a visual point indicated by the absolute visual-line direction vector obtained by making use of the corrected view matrix, the visual-point correction unit 35 generates the two-dimensional map image data of a two-dimensional map image obtained as a result of a process to convert the three-dimensional map image TDF into the two-dimensional map image by projecting the three-dimensional map image TDF onto a two-dimensional plane in order to result in the two-dimensional map image that will be obtained if the viewer is looking down the three-dimensional map image TDF from the visual point, and supplies the two-dimensional map image data to the display unit 18. The visual point is a visual point located at the visual-point position obtained as a result of correcting the interpolated visual-point position of the interpolated visual point. However, the visual-point information determination unit 34 sequentially computes the interpolated visual-point altitude and the interpolated visual-line angle so that the set reference visual-point altitude and set reference visual-line angle of the set reference visual point approach the set target visual-point altitude and set target visual-line angle of the set target visual point little by little as described above. Thus, every time the visual-point information determination unit 34 computes an interpolated visual-point altitude and an interpolated visual-line angle, the visual-point correction unit 35 corrects the parallel movement component t of the parallel movement conversion matrix MV based on the interpolated visual-point altitude and the interpolated visual-line angle, and generates an absolute visual-line direction vector by making use of a corrected view matrix obtained as a result of the correction process. Then, the visual-point correction unit 35 generates the two-dimensional map image data of a two-dimensional map image obtained as a result of a process to convert the three-dimensional map image TDF into the two-dimensional map image by projecting the three-dimensional map image TDF onto a two-dimensional plane in order to result in the two-dimensional map image that will be obtained if the viewer is looking down the three-dimensional map image TDF from a visual point indicated by the absolute visual-line direction vector.

In this way, when the visual-point correction unit 35 is finally notified of the set target visual-point altitude and the set target visual-line angle at the end of the process carried out by the visual-point information determination unit 34 to compute the interpolated visual-point altitude and the interpolated visual-line angle, the visual-point correction unit 35 corrects the parallel movement component t of the parallel movement conversion matrix MV based on the set target visual-point altitude and the set target visual-line angle in the same way as the process to correct the parallel movement component t of the parallel movement conversion matrix MV based on the interpolated visual-point altitude and the interpolated visual-line angle as described above, and generates a final absolute visual-line direction vector by making use of a corrected view matrix obtained as a result of the process to correct the parallel movement component t of the parallel movement conversion matrix MV based on the set target visual-point altitude and the set target visual-line angle. Then, the visual-point correction unit 35 generates the two-dimensional slanting-under long-shot map image data of the two-dimensional slantingly-under long-shot map image DDF2 or the two-dimensional right-under long-shot map image data of the two-dimensional right-under long-shot map image UDF1. As described before, the two-dimensional slantingly-under long-shot map image DDF2 and the two-dimensional right-under long-shot map image UDF1 are a two-dimensional map image obtained as a result of a process to convert the three-dimensional map image TDF into the two-dimensional map image by projecting the three-dimensional map image TDF onto a two-dimensional plane in order to result in the two-dimensional map image that will be obtained if the viewer is looking down the three-dimensional map image TDF from a visual point indicated by the final absolute visual-line direction vector. The visual point indicated by the final absolute visual-line direction vector is a visual point located at a visual-point position obtained as a result of a process to correct the set target visual-point position of a set target visual point. By the way, when the navigation apparatus 10 is activated, the visual-point correction unit 35 generates the two-dimensional slanting-under long-shot map image data of the two-dimensional slantingly-under long-shot map image DDF1 obtained as a result of a process to convert the three-dimensional map image TDF into the two-dimensional map image by projecting the three-dimensional map image TDF onto a two-dimensional plane in order to result in the two-dimensional slantingly-under long-shot map image DDF1 that will be obtained if the viewer is looking down the three-dimensional map image TDF in a slanting direction from the initially used visual point, and supplies the generated two-dimensional slanting-under long-shot map image data to the display unit 18. As described above, the visual-point correction unit 35 corrects the parallel movement component t of the visual point having a visual-point altitude and a visual-line angle, which are supplied from the visual-point information determination unit 34, and corrects the position of the visual point in accordance with a corrected parallel movement component obtained as a result of the process to correct the parallel movement component t. The visual-point altitude supplied from the visual-point information determination unit 34 can be a set target visual-point altitude or a set reference visual-point altitude. By the same token, the visual-line angle supplied from the visual-point information determination unit 34 can be a set target visual-line angle or a set reference visual-line angle.

Figure 9:
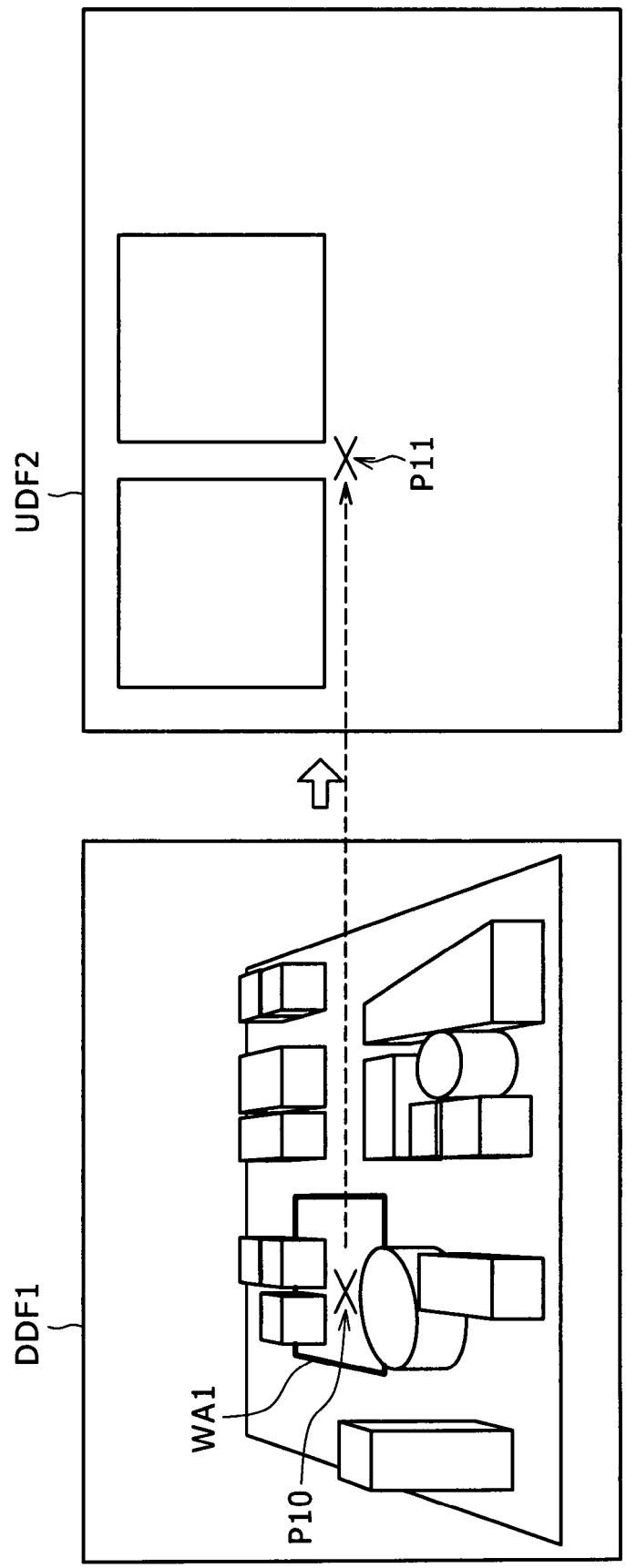
FIG. 9 is a roughly explanatory diagram to be referred to in description of a process to switch a display screen from a two-dimensional slantingly-under long-shot map image to a two-dimensional right-under long-shot map image.

As described before, when the user specifies a user-specified point P10 on the display screen of the display section 20 displaying the two-dimensional slantingly-under long-shot map image DDF1 in the two-dimensional slantingly-under long-shot map image display mode, the central processing unit 11 generates the two-dimensional right-under long-shot map image UDF2 as shown in FIG. 9. The central processing unit 11 generates the two-dimensional right-under long-shot map image UDF2 by widening an area widened area WA1 included in the three-dimensional map image TDF as an area including a specified-point corresponding point P11 existing on the three-dimensional map image TDF as a point corresponding to the user-specified point P10 and projecting the widened area widened area WA1 on a two-dimensional plane. At that time, with the visual-point position corrected, the central processing unit 11 makes the specified-point corresponding point P11 existing on the three-dimensional map image TDF face the user-specified point P10 on the display screen as a point on the two-dimensional right-under long-shot map image UDF2. That is to say, when the user specifies a user-specified point P10 on the display screen, the central processing unit 11 is capable of making the specified-point corresponding point P11 existing on the three-dimensional map image TDF as a point corresponding to the user-specified point P10 stay at an approximately fixed position in the two-dimensional slantingly-under long-shot map image DDF1 and the two-dimensional slantingly-under long-shot map image DDF2, which are displayed alternately on the display screen of the display section 20 by sequentially replacing one with the other.

However, when the user specifies a user-specified point P10 on the display screen of the display section 20 as described above, the central processing unit 11 sets the interpolated visual-point position of an interpolated visual point between a set reference visual point and a set target visual point and also corrects the interpolated visual-point position in order to move the visual point from a position separated away from the three-dimensional map image TDF in a slanting upward direction to a position right above the three-dimensional map image TDF little by little with the specified-point corresponding point P11 on the three-dimensional map plane TDG kept in a state of facing the user-specified point P10 on the display screen as it is, and, while narrowing a projection portion for the three-dimensional map image TDF from the entire size to the eventual widened area widened area WA1 little by little, the central processing unit 11 sequentially converts the three-dimensional map image TDF into a two-dimensional map image corresponding to the position of the visual point and the projection portion, displaying the two-dimensional map image on the display screen of the display section 20. Then, the central processing unit 11 finally converts the widened area widened area WA1 of the three-dimensional map image TDF into the two-dimensional right-under long-shot map image UDF2 as shown in FIG. 9 by projecting the widened area widened area WA1 onto a two-dimensional plane in order to result in the two-dimensional right-under long-shot map image UDF2 that will be obtained if the viewer is looking down the widened area widened area WA1 in the vertical direction from a visual point existing at a position right above the widened area widened area WA1, and displays the two-dimensional right-under long-shot map image UDF2 on the display screen of the display section 20. Thus, when the user specifies a user-specified point P10 on the display screen of the display section 20 in the two-dimensional slantingly-under long-shot map image display mode, the central processing unit 11 is capable of changing the displayed image shown to the user from a state of looking down the three-dimensional map image TDF in a slanting direction from a visual point separated away from the three-dimensional map image TDF in a slanting upward direction to a final state of looking down the widened area widened area WA1 of the three-dimensional map image TDF as an enlarged view in the vertical direction from a visual point existing at a position right above the widened area widened area WA1 by narrowing a portion including the specified-point corresponding point P11 on the three-dimensional map plane TDG little by little in a zoom-up operation while rotating the visual point to a position right above the three-dimensional map image TDF with the specified-point corresponding point P11 on the three-dimensional map plane TDG kept in a state of facing the user-specified point P10 on the display screen as it is.

Figure 10:
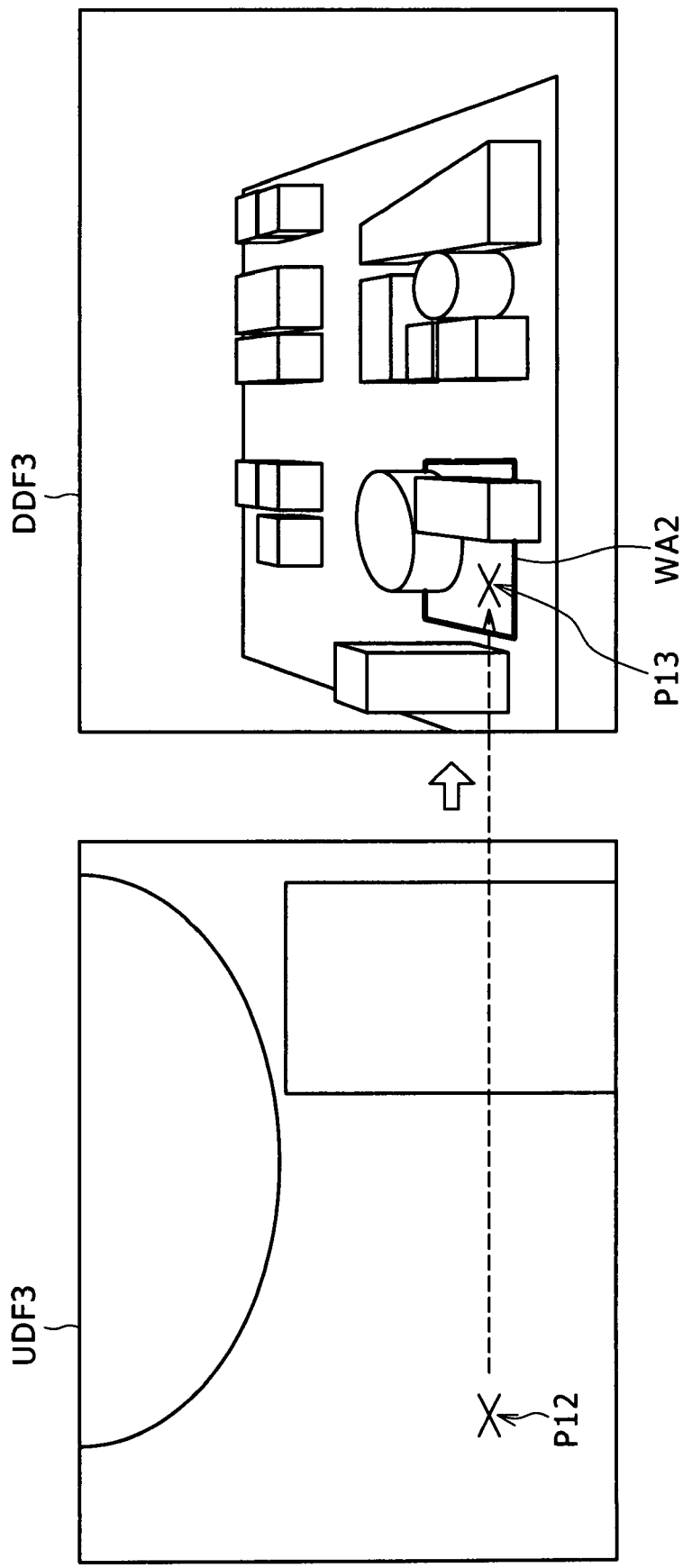
FIG. 10 is a roughly explanatory diagram to be referred to in description of a process to switch a display screen from a two-dimensional right-under long-shot map image to a two-dimensional slantingly-under long-shot map image.

In addition, when the user specifies a user-specified point P12 on the display screen of the display section 20 displaying a two-dimensional right-under long-shot map image UDF3 in the two-dimensional right-under long-shot map image display mode, the central processing unit 11 generates a two-dimensional slantingly-under long-shot map image DDF3 as shown in FIG. 10. The central processing unit 11 generates the two-dimensional slantingly-under long-shot map image DDF3 by widening a projection portion included in the three-dimensional map image TDF as a portion including a specified-point corresponding point P13 corresponding to the user-specified point P12 and projecting the widened projection portion on a two-dimensional plane. The process of widening a projection portion included in the three-dimensional map image TDF implies a process of shrinking the three-dimensional map image TDF itself. At that time, with the visual-point position corrected, the central processing unit 11 is capable of making the specified-point corresponding point P13 existing on the three-dimensional map image TDF face the user-specified point P12 on the display screen as a point on the two-dimensional slantingly-under long-shot map image DDF3. That is to say, when the user specifies the user-specified point P12 on the display screen, the central processing unit 11 is capable of making the specified-point corresponding point P13 existing on the three-dimensional map image TDF as a point corresponding to the user-specified point P12 stay at an approximately fixed position in the two-dimensional slantingly-under long-shot map image DDF3 and the two-dimensional right-under long-shot map image UDF3, which are displayed alternately on the display screen of the display section 20 by sequentially replacing one with the other.

However, when the user specifies a user-specified point 12 on the display screen of the display section 20 as described above in the same way as the two-dimensional right-under long-shot map image display mode, in the same way as the two-dimensional slantingly-under long-shot map image display mode described above, the central processing unit 11 sets the interpolated visual-point position of an interpolated visual point between a set reference visual point and a set target visual point and also corrects the interpolated visual-point position in order to move the visual point from a position right above the three-dimensional map image TDF to a position separated away from the three-dimensional map image TDF in a slanting upward direction little by little with the specified-point corresponding point P13 on the three-dimensional map plane TDG kept in a state of facing the user-specified point P12 on the display screen as it is, and, while widening a projection portion for the three-dimensional map image TDF from a widened area widened area WA2 little by little, the central processing unit 11 sequentially converts the three-dimensional map image TDF into a two-dimensional map image corresponding to the position of the visual point and the projection portion, displaying the two-dimensional map image on the display screen of the display section 20. Then, the central processing unit 11 finally converts the three-dimensional map image TDF into the two-dimensional slantingly-under long-shot map image DDF3 as shown in FIG. 10 by projecting the three-dimensional map image TDF onto a two-dimensional plane in order to result in the two-dimensional slantingly-under long-shot map image DDF3 that will be obtained if the viewer is looking down the three-dimensional map image TDF in a slanting direction from a visual point separated away from the three-dimensional map image TDF in the slanting upward direction, and displays the two-dimensional slantingly-under long-shot map image DDF3 on the display screen of the display section 20. Thus, when the user specifies the user-specified point P12 on the display screen of the display section 20 in the two-dimensional right-under long-shot map image display mode, the central processing unit 11 is capable of changing the displayed image shown to the user from a state of looking down the widened area widened area WA2 on the three-dimensional map image TDF as an enlarged view in the vertical direction from a visual point existing at a position right above the widened area widened area WA2 to a final state of looking down the three-dimensional map image TDF in a slanting direction from a visual point separated away from the three-dimensional map image TDF in a slanting upward direction by widening a portion included in the three-dimensional map plane TDG as a portion including the specified-point corresponding point P13 on the three-dimensional map plane TDG little by little in a zoom-out operation while rotating the visual point to a position separated away from the three-dimensional map image TDF in the slanting upward direction with the specified-point corresponding point P13 on the three-dimensional map plane TDG kept in a state of facing the user-specified point P12 on the display screen as it is.

It is to be noted that, in the case of this embodiment, when the central processing unit 11 switches the display screen of the display section 20 from a two-dimensional map image to another one as explained earlier by referring to FIGS. 9 and 10 respectively, the central processing unit 11 displays the frame of the widened area WA1 on the three-dimensional plane TDG as an area for generating the two-dimensional right-under long-shot map image UDF2 as a next image to replace the two-dimensional slantingly-under long-shot map image DDF1 or DDF3 as shown in FIG. 9, or displays the frame of the widened area widened area WA2 on the three-dimensional plane TDG as an area corresponding to the two-dimensional right-under long-shot map image UDF3 already replaced by the two-dimensional slantingly-under long-shot map image DDF3 on the three-dimensional map image TDF as shown in FIG. 10. When the user is requested to arbitrarily specify a user-specified point on the display screen of the display section 20, the user may touch the display screen typically with the tip of its finger and then removes the finger from the display screen. In this case, the central processing unit 11 determines that the user has specified a user-specified point and detects a point that is finally touched before the finger is removed from the screen as the user-specified point. In addition, when the user moves the finger to scrub the surface of the display screen of the display section 20 over the surface with the finger touching the surface as it is, the central processing unit 11 moves the drawing range of the three-dimensional map image TDF in either of the two-dimensional slantingly-under long-shot map images DDF1 to DDF3 and the two-dimensional right-under long-shot map images UDF1 to UDF3, which is displayed on the display screen of the display section 20, in a direction indicated by the movement of the finger. Thus, the central processing unit 11 is capable of easily showing the user a drawing portion, which is unseen at the time either of the two-dimensional slantingly-under long-shot map images DDF1 to DDF3 and the two-dimensional right-under long-shot map images UDF1 to UDF3 is displayed on the display screen of the display section 20, as a drawing portion of the three-dimensional map image TDF.

Figure 11:
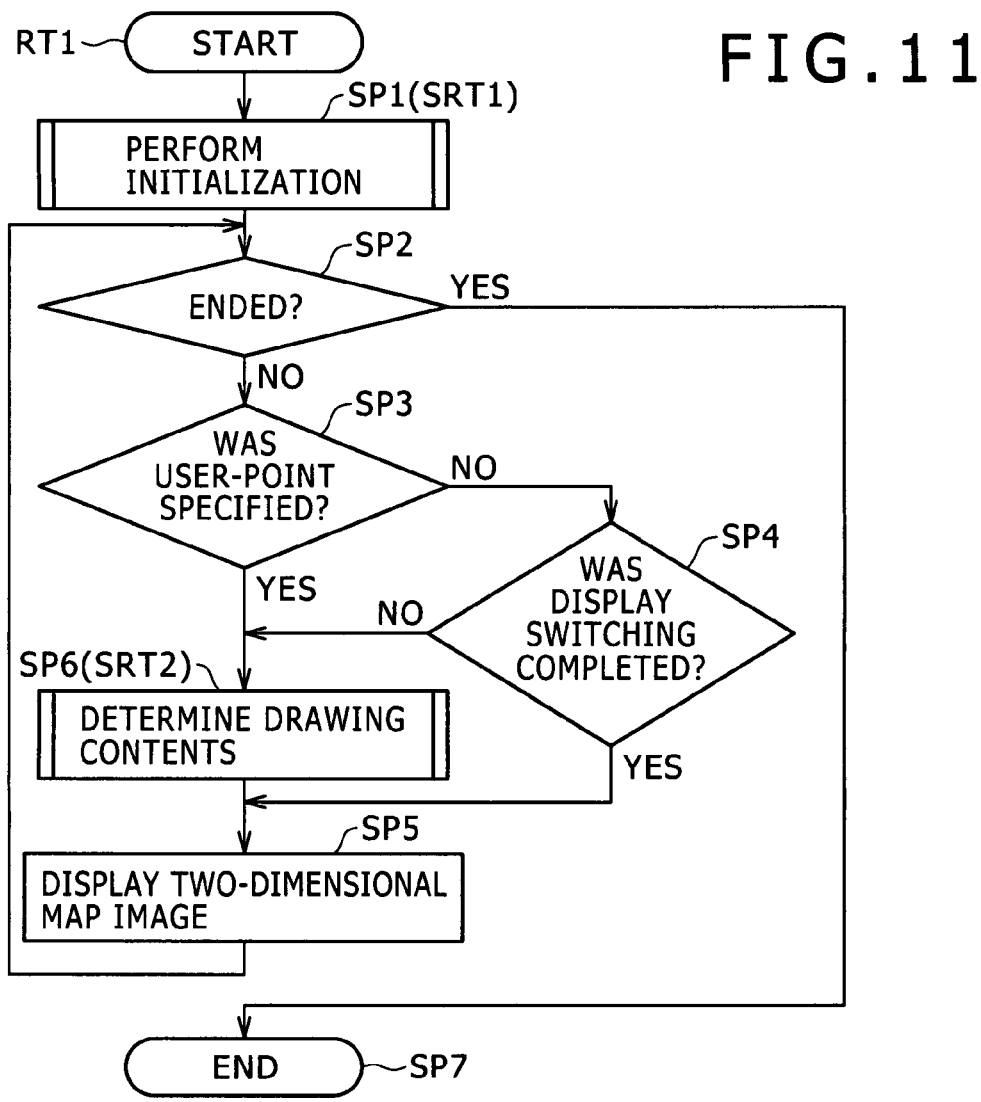
FIG. 11 shows a flowchart representing the procedure of processing to control a display.
Figure 12:
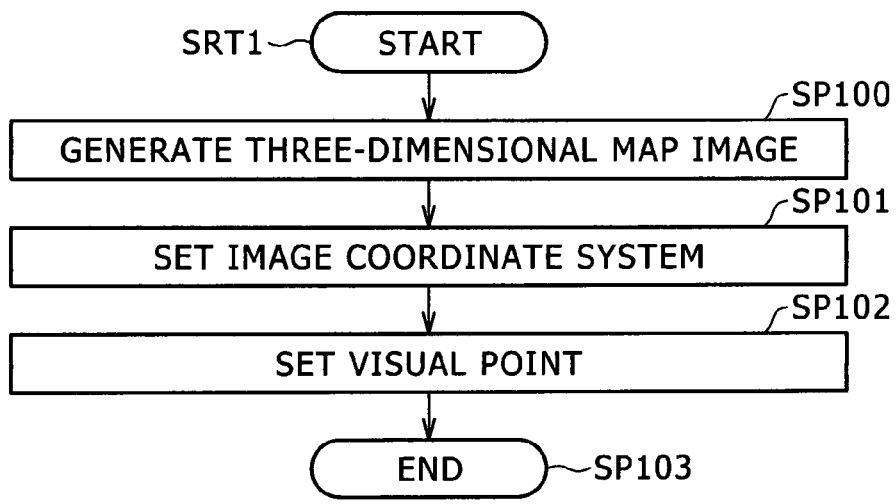
FIG. 12 shows a flowchart representing the procedure of initialization processing.
Figure 13:
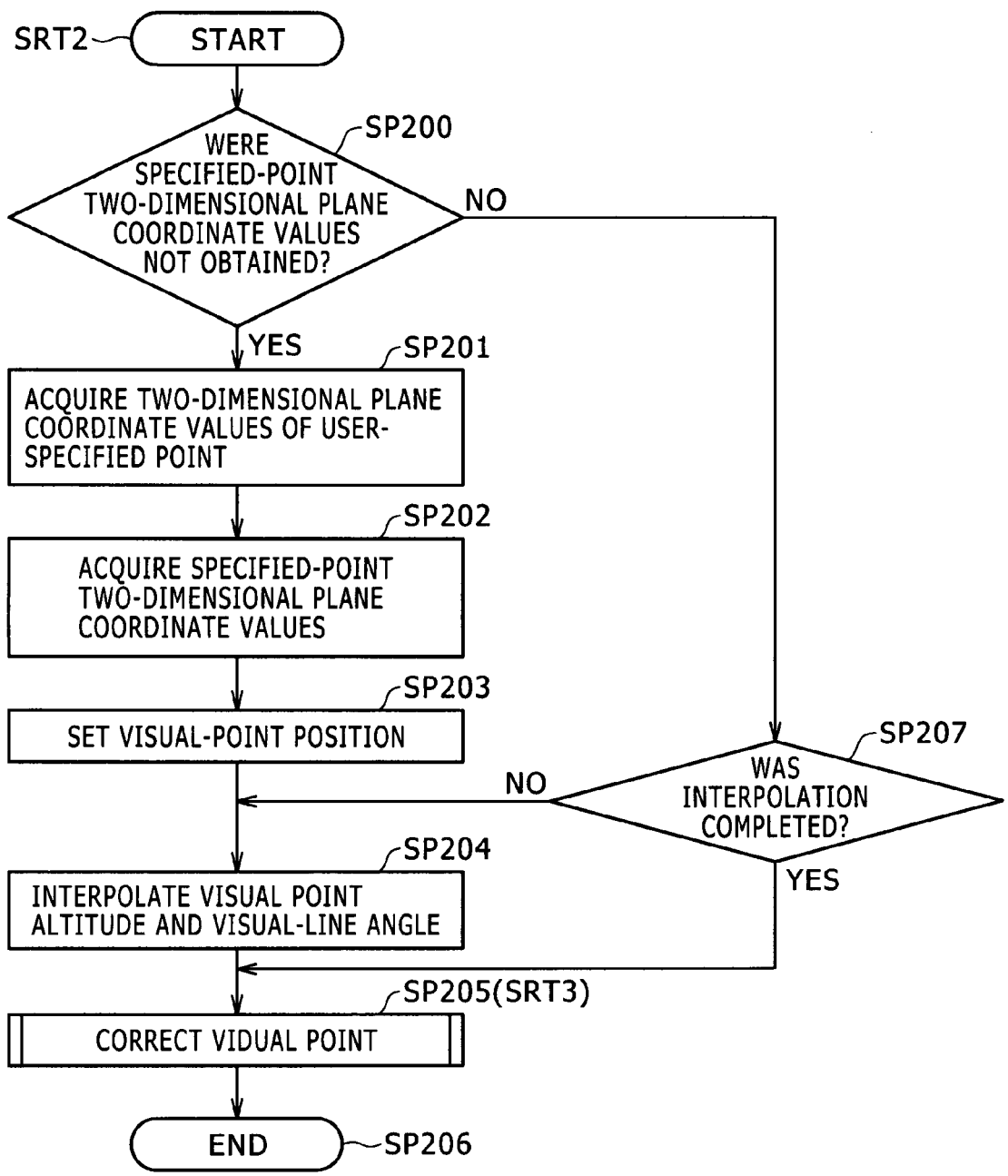
FIG. 13 shows a flowchart representing the procedure of processing to determine drawing contents.
Figure 14:
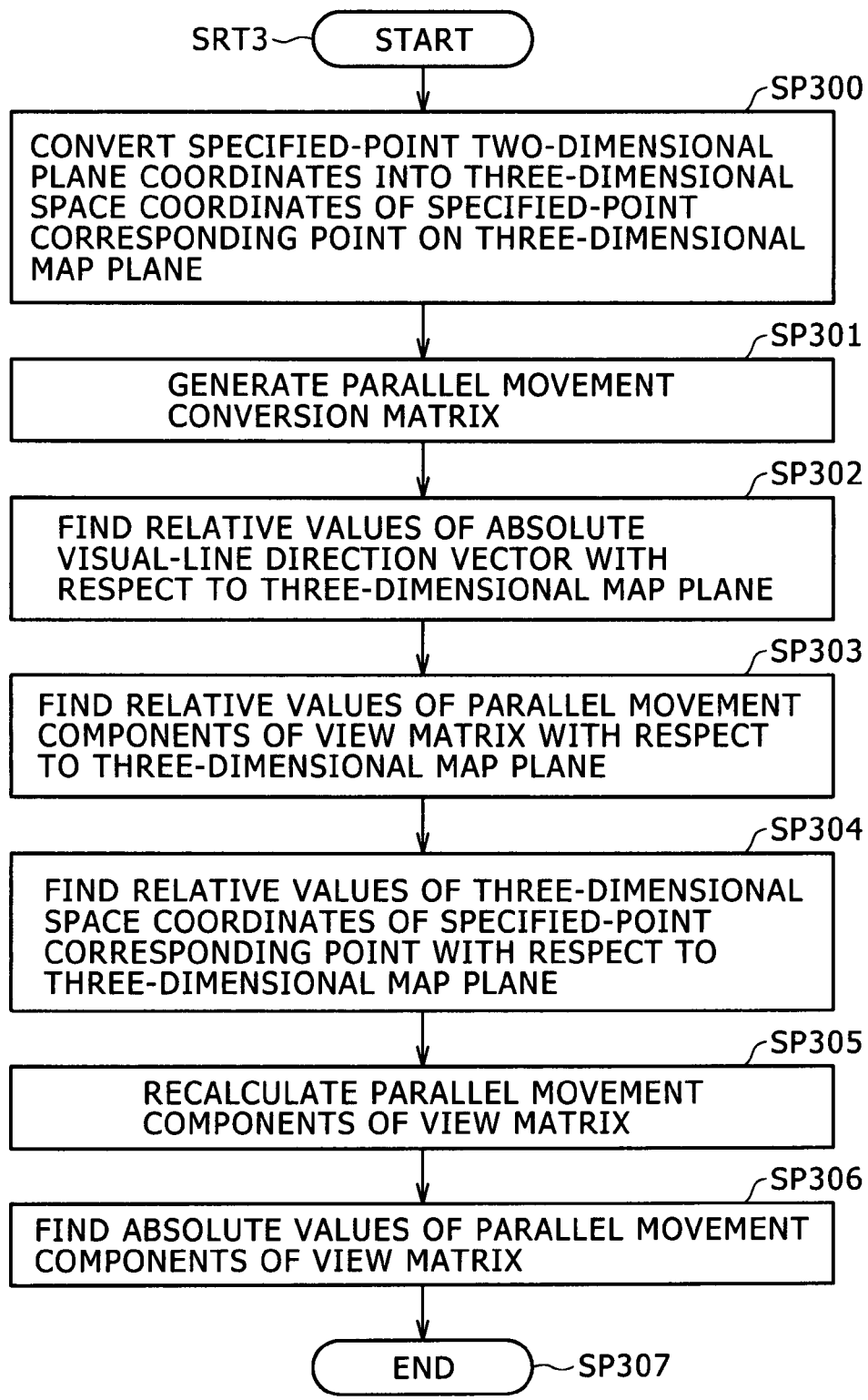
FIG. 14 shows a flowchart representing the procedure of processing to correct the position of a visual point.
Figure 15B:
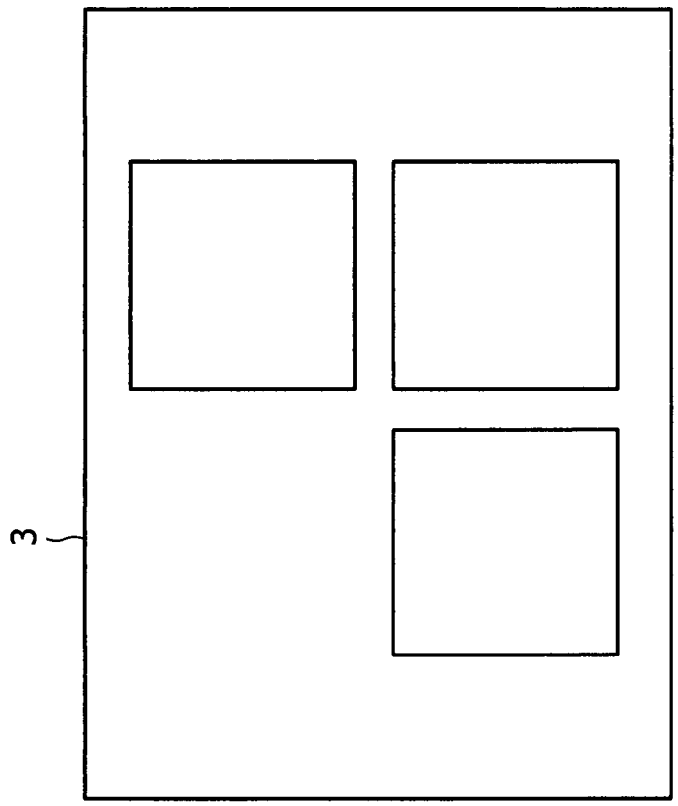
FIGS. 15A and 15B is a diagram showing rough configurations of a two-dimensional slantingly-under long-shot map image in the past and a two-dimensional right-under long-shot map image in the past.
Figure 15A:
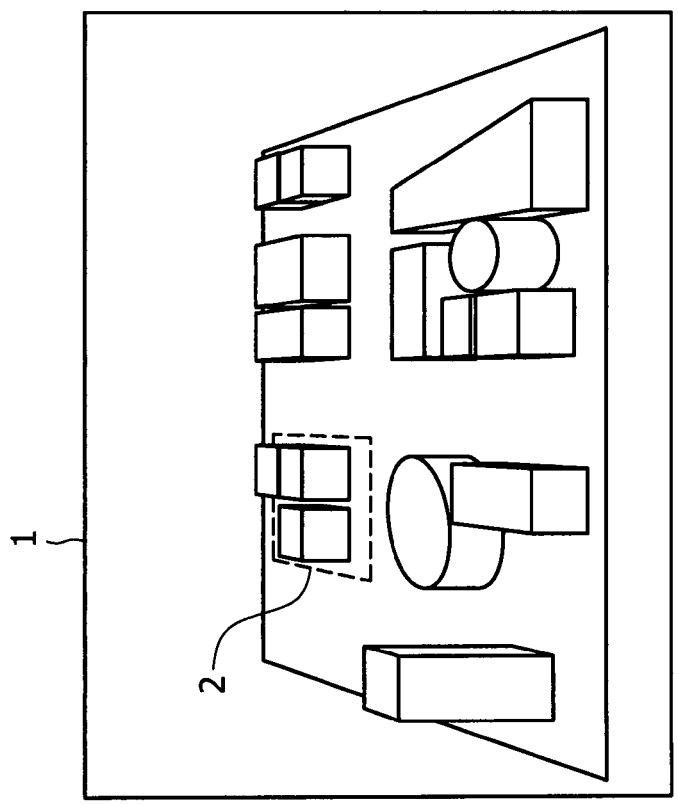
Figure 16:
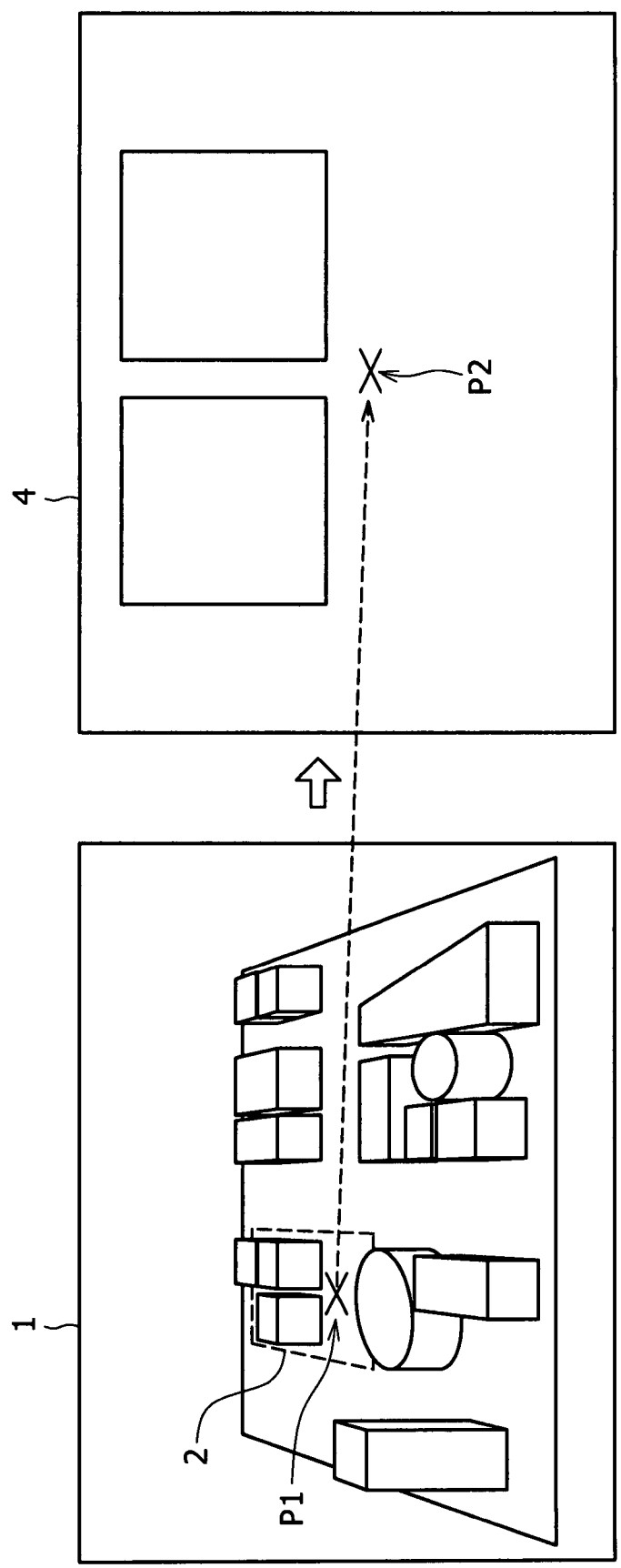
FIG. 16 is a roughly explanatory diagram to be referred to in description of a process to switch a display screen from a two-dimensional slantingly-under long-shot map image in the past to a conventional two-dimensional right-under long-shot map image.

By referring to a display control processing procedure RT1 represented by a flowchart shown in FIG. 11 as well as display control processing sub-procedures SRT2 to SRT4 represented by flowcharts shown in FIGS. 12 to 14 respectively, the following description collectively explains display control processing, which can be carried out by the display control functions described above. The display control processing procedure RT1 represented by the flowchart shown in FIG. 11 is started in accordance with a display control program when the navigation apparatus 10 is activated. When the display control processing procedure RT1 represented by the flowchart shown in FIG. 11 is started, at the first step SP1 of the flowchart, the central processing unit 11 carries out initialization processing in accordance with an initialization processing sub-procedure SRT1 represented by the flowchart shown in FIG. 12. The flowchart shown in FIG. 12 as the flowchart representing the initialization processing sub-procedure SRT1 begins with a step SP100 at which the central processing unit 11 constructs a three-dimensional virtual space TDA and generates a three-dimensional map image TDF. Then, the flow of the initialization processing sub-procedure SRT1 goes on to the next step SP101. At the step SP101, the central processing unit 11 sets a two-dimensional plane coordinate system for the display screen of the display section 20. Then, the flow of the initialization processing sub-procedure SRT1 goes on to the next step SP102. At the step SP102, the central processing unit 11 sets an initially used visual point to be utilized in a process to project the three-dimensional map image TDF in the three-dimensional virtual space TDA onto a two-dimensional plane. Then, the flow of the initialization processing sub-procedure SRT1 goes on to the next step SP103. At the step SP103, the central processing unit 11 completes the initialization processing sub-procedure SRT1, hence, finishing the initialization processing. Then, the flow of the initialization processing sub-procedure SRT1 goes on to a step SP2 of the flowchart shown in FIG. 11.

At the step SP2, the central processing unit 11 produces a result of determination as to whether or not the display control processing has been ended. If the determination result produced at the step SP2 is a denial, the denial result of the determination indicates that the user still makes a request to view the three-dimensional map image TDF as one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3. Thus, if the central processing unit 11 produces the denial result of the determination, the flow of the display control processing procedure RT1 goes on to a step SP3. At the step SP3, the central processing unit 11 produces a result of determination as to whether or not the user has specified a user-specified point on the display screen of the display section 20. If the determination result produced at the step SP3 is a denial, the denial result of the determination indicates that the two-dimensional slantingly-under long-shot map image DDF1 has not been displayed on the display screen of the display section 20 since the activation of the navigation apparatus 10 or the user makes a request to continue the display of one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 on the display screen of the display section 20. Thus, if the central processing unit 11 produces the denial result of the determination, the flow of the display control processing procedure RT1 goes on to a step SP4.

At the step SP4, the central processing unit 11 produces a result of determination as to whether or not a process to switch the display screen of the display section 20 from any one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 to another one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 has been completed. If the determination result produced at the step SP4 is an affirmation, the affirmation result of the determination indicates that the two-dimensional slantingly-under long-shot map image DDF1 be displayed on the display screen of the display section 20 by making use of the initially used visual point right after the navigation apparatus 10 is activated or one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 is continuously displayed on the display screen of the display section 20 at the present time. Thus, if the central processing unit 11 produces the affirmation result of the determination, the flow of the display control processing procedure RT1 goes on to a step SP5. At the step SP5, the central processing unit 11 converts the three-dimensional map image TDF into the two-dimensional slantingly-under long-shot map image DDF1 by projecting the three-dimensional map image TDF on a two-dimensional plane to obtain a result, which will be obtained if the viewer is looking down the three-dimensional map image TDF from the initially used visual point in a slanting direction and displays the two-dimensional slantingly-under long-shot map image DDF1 on the display screen of the display section 20 in case the navigation apparatus 10 is in a state right after the display section 20 is activated. Then, the flow of the display control processing procedure RT1 goes back to the step SP2. If the denial determination result obtained by the central processing unit 11 at the step SP4 indicates that one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 is currently displayed on the display screen of the display section 20, at the step SP5, the central processing unit 11 keeps the displayed image on the display screen of the display section 20 as it is. Then, the flow of the display control processing procedure RT1 goes back to the step SP2.

If the determination result produced at the step SP3 is an affirmation, on the other hand, the affirmation result of the determination indicates that the user has specified a user-specified point on the display screen of the display section 20 in order to switch the display screen of the display section 20 from any one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 to another one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3. Thus, if the central processing unit 11 produces the affirmation result of the determination, the flow of the display control processing procedure RT1 goes on to a step SP6. At the step SP6, the central processing unit 11 carries out processing to determine drawing contents in accordance with a processing sub-procedure SRT2 represented by the flowchart shown in FIG. 13. In addition, if the determination result produced at the step SP4 is a denial, on the other hand, the denial result of the determination indicates that a process to switch the display screen of the display section 20 from any one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 to another one of the two-dimensional slantingly-under long-shot map image DDF1 to the two-dimensional slantingly-under long-shot map image DDF3 and the two-dimensional right-under long-shot map image UDF1 to the two-dimensional right-under long-shot map image UDF3 is underway. Thus, if the central processing unit 11 produces the denial result of the determination, the flow of the display control processing procedure RT1 also goes on to the step SP6.

When the central processing unit 11 starts the processing sub-procedure SRT2 to determine drawing contents, the first step SP200 of the flowchart shown in FIG. 13 as a flowchart representing the processing sub-procedure SRT2 is executed by the central processing unit 11 to produce a result of determination as to whether the specified-point two-dimensional plane coordinate values for the user-specified point have not been obtained. If the determination result produced at the step SP200 is an affirmation, the affirmation result of the determination indicates that the specified-point two-dimensional plane coordinate values for the user-specified point have not been obtained because the navigation apparatus 10 is in a state right after an operation carried out by the user to specify the user-specified point on the screen display of the display section 20. Thus, if the central processing unit 11 produces the affirmation result of the determination, the flow of the drawing-contents determination processing sub-procedure SRT2 goes on to a step SP201. At the step SP201, the central processing unit 11 acquires the two-dimensional plane coordinate values representing the position of the user-specified point from the input unit 23. Then, the flow of the drawing-contents determination processing sub-procedure SRT2 goes on to the next step SP202. At the step SP202, the central processing unit 11 converts the user-specified point into a projection point on the XY plane in the three-dimensional virtual space TDA, acquiring specified-point two-dimensional plane coordinate values in accordance with the position of the projection point and the three-dimensional map plane TDG in the three-dimensional virtual space TDA. Then, the flow of the drawing-contents determination processing sub-procedure SRT2 goes on to the next step SP203. At the step SP203, the central processing unit 11 sets the set target visual-point altitude and set target visual-line angle of the set target visual point as a set target visual-point position in accordance with the image display mode set at that point of time. That is to say, at the step SP203, the central processing unit 11 determines visual-point information to be used for changing the visual point. Then, the flow of the drawing-contents determination processing sub-procedure SRT2 goes on to the next step SP204.

At the step SP204, the central processing unit 11 carries out an interpolation process on the set reference visual-point altitude and the set target visual-point altitude in order to find an interpolated visual-point altitude as well as an interpolation process on the set reference visual-line angle and the set target visual-line angle in order to find an interpolated visual-line angle. Then, the flow of the drawing-contents determination processing sub-procedure SRT2 goes on to the next step SP205. At the step SP205, the central processing unit 11 carries out processing to correct the visual point in accordance with a visual-point correction processing sub-procedure SRT3 represented by the flowchart shown in FIG. 14. Then, the flow of the drawing-contents determination processing sub-procedure SRT2 goes on to the next step SP206. At the step SP206, the central processing unit 11 finishes the drawing-contents determination processing sub-procedure SRT2 and the flow of the processing sub-procedure SRT2 back to the step SP5 of the flowchart shown in FIG. 11.

If the determination result produced at the step SP200 is a denial, the denial result of the determination indicates that the specified-point two-dimensional plane coordinate values for the user-specified point have been obtained, however, the processing to correct the visual point in order to switch the display screen is still underway. Thus, if the central processing unit 11 produces the denial result of the determination, the flow of the drawing-contents determination processing sub-procedure SRT2 goes on to a step SP207. At the step SP207, the central processing unit 11 produces a result of determination as to whether or not an interpolation process carried out on the set reference visual-point altitude and the set target visual-point altitude in order to find an interpolated visual-point altitude as well as an interpolation process carried out on the set reference visual-line angle and the set target visual-line angle in order to find an interpolated visual-line angle have been completed. If the determination result produced at the step SP207 is a denial, the denial result of the determination indicates that an interpolated visual-point altitude as well as an interpolated visual-line angle, which are to be used in a process to switch the display screen, have not been found from the set reference visual-point altitude and the set target visual-point altitude as well as the set reference visual-line angle and the set target visual-line angle respectively. That is to say, the denial result of the determination indicates that the interpolation processes have not been completed. Thus, if the central processing unit 11 produces the denial result of the determination, the flow of the drawing-contents determination processing sub-procedure SRT2 goes on to the step SP204. If the determination result produced at the step SP207 is an affirmation, on the other hand, the affirmation result of the determination indicates that the interpolation process carried out on the set reference visual-point altitude and the set target visual-point altitude in order to find an interpolated visual-point altitude as well as the interpolation process carried out on the set reference visual-line angle and the set target visual-line angle in order to find an interpolated visual-line angle have been completed, but a process to correct the visual point by making use of the set target visual-point altitude and set target visual-line angle of the final set target visual point has not been completed. Thus, if the central processing unit 11 produces the affirmation result of the determination, the flow of the drawing-contents determination processing sub-procedure SRT2 goes on to the step SP205.

When the central processing unit 11 starts the processing sub-procedure SRT3 to correct a visual point, the first step SP300 of the flowchart shown in FIG. 14 as a flowchart representing the processing sub-procedure SRT3 is executed by the central processing unit 11 to convert specified-point two-dimensional plane coordinate values into three-dimensional space coordinate values representing the position of an specified-point corresponding point on the three-dimensional map plane TDG. Then, the flow of the visual-point correction processing sub-procedure SRT3 goes on to the next step SP301. At the step SP301, the central processing unit 11 generates a parallel movement conversion matrix M on the basis of a matix S. Then, the flow of the visual-point correction processing sub-procedure SRT3 goes on to the next step SP302. At the step SP302, the central processing unit 11 generates a visual-point direction vector by adding a focal distance Lf to the specified-point two-dimensional plane coordinate values. In addition, the central processing unit 11 generates a parallel movement conversion matrix MV and makes use of the generated parallel movement conversion matrix MV to find relative values of the visual-point direction vector. After that, the central processing unit 11 makes use of the parallel movement conversion matrix M to find relative values of an absolute visual-point direction vector v. Then, the flow of the visual-point correction processing sub-procedure SRT3 goes on to the next step SP303.

At the step SP303, the central processing unit 11 makes use of the parallel movement conversion matrix M to find the absolute values of a parallel movement component t of the parallel movement conversion matrix MV. Then, the flow of the visual-point correction processing sub-procedure SRT3 goes on to the next step SP304. At the step SP304, the central processing unit 11 makes use of the parallel movement conversion matrix M to find relative values of the three-dimensional space coordinate values associated with the specified-point corresponding point as three-dimensional space coordinate values corresponding to the specified-point two-dimensional plane coordinate values. Then, the flow of the visual-point correction processing sub-procedure SRT3 goes on to the next step SP305. At the step SP305, the central processing unit 11 computes a corrected relative parallel movement vector Th in accordance with Eq. (4) given earlier from a relative three-dimensional space coordinate vector Q, a relative parallel movement vector T and a relative visual-line direction vector V taking the three-dimensional map plane TDG as a reference. Then, the flow of the visual-point correction processing sub-procedure SRT3 goes on to the next step SP306. At the step SP306, the central processing unit 11 makes use of the parallel movement conversion matrix M to find the absolute values of the corrected relative parallel movement vector Th, and corrects the parallel movement conversion matrix MV by making use of the corrected parallel movement components obtained as a result of finding the absolute values of the corrected relative parallel movement vector Th. Then, the flow of the visual-point correction processing sub-procedure SRT3 goes on to the next step SP307. At the step SP307, the central processing unit 11 finishes the visual-point correction processing sub-procedure SRT3, and the flow of the visual-point correction processing sub-procedure SRT3 goes on to the step SP206 of the flowchart shown in FIG. 13.

As described above, when the user arbitrarily specifies a user-specified point on the display screen of the display section 20, the central processing unit 11 repeatedly carries out the processes of the steps SP2 to SP5 forming a cycle one step after another. In each cycle, the central processing unit 11 finds an interpolated visual-point altitude by carrying out interpolation processing based on a set reference visual-point altitude and a set target visual-point altitude as well as an interpolated visual-line angle by carrying out other interpolation processing based on a set reference visual-line angle and a set target visual-line angle. Then, on the basis of the interpolated visual-point altitude and the interpolated visual-line angle, the central processing unit 11 carries out processing to correct the visual point. In addition, when the central processing unit 11 completes the execution of a cycle consisting of the steps SP2 to SP5 in order to find an interpolated visual-point altitude by carrying out interpolation processing based on a set reference visual-point altitude and a set target visual-point altitude as well as an interpolated visual-line angle by carrying out other interpolation processing based on a set reference visual-line angle and a set target visual-line angle, the central processing unit 11 executes the next cycle. The cycle is executed repeatedly. Eventually, on the basis of the final interpolated visual-point altitude and the final interpolated visual-line angle, the central processing unit 11 carries out final processing to correct the visual point. In each processing to correct the visual point, the central processing unit 11 makes use of a correction view matrix to correct the interpolated visual-point position of the interpolated visual point and the set target visual-point position of the set target visual point, setting the corrected interpolated visual-point position and the corrected set target visual-point position. At the step SP5, the central processing unit 11 makes use of the corrected interpolated visual-point position and the corrected set target visual-point position to convert the three-dimensional map image TDF into a two-dimensional map image and displays the two-dimensional map image on the display screen of the display section 20.

If the determination result produced at the step SP2 is an affirmation, on the other hand, the affirmation result of the determination indicates that the user has made a request to end the processing to display a two-dimensional map image on the display screen of the display section 20 or it is necessary to end the processing to display a two-dimensional map image on the display screen of the display section 20 due to a hardware restriction such as an insufficient storage capacity of the memory. Thus, if the central processing unit 11 produces the affirmation result of the determination, the flow of the display control processing procedure RT1 goes on to a step SP7. At the step SP7, the central processing unit 11 terminates the execution of the entire display control processing procedure RT1.

In the configuration described above, the navigation apparatus 10 converts the three-dimensional map image TDF constructed in the three-dimensional virtual space TDA into any specific one of the two-dimensional slantingly-under long-shot map images DDF1 to DDF3 by projecting the three-dimensional map image TDF onto a two-dimensional plane in order to result in the specific one of the two-dimensional slantingly-under long-shot map images DDF1 to DDF3 that is going to appear to the viewer if the viewer is looking down the three-dimensional map image TDF in a slanting direction from a predetermined visual point separated away from the three-dimensional map image TDF in a slanting upward direction at a predetermined visual-line angle θ1, and displays the specific one of the two-dimensional slantingly-under long-shot map images DDF1 to DDF3 on the display screen of the display section 20. In this state, when the user arbitrarily specifies a user-specified point on the display screen of the display section 20 displaying the specific one of the two-dimensional slantingly-under long-shot map images DDF1 to DDF3, the navigation apparatus 10 takes a specified-point corresponding point, which exists on the three-dimensional map plane TDG of the three-dimensional map image TDF as a point corresponding to a confirmed user-specified point for the user-specified point, as a focus position, and sets the set target visual-point position of a set target visual point existing at a position right above the three-dimensional map image TDF at a visual-line angle θ2 different from the predetermined visual-line angle θ1. Then, the navigation apparatus 10 corrects the set target visual-point position of the set target visual point existing at a position right above the three-dimensional map image TDF so as to make the specified-point corresponding point on the three-dimensional map image TDF face the confirmed user-specified point on the display screen of the display section 20, and sets the corrected set target visual-point position. Then, the navigation apparatus 10 converts the three-dimensional map image TDF constructed in the three-dimensional virtual space TDA into any specific one of the two-dimensional right-under long-shot map images UDF1 to UDF3 by projecting the three-dimensional map image TDF onto a two-dimensional plane in order to result in the specific one of the two-dimensional right-under long-shot map images UDF1 to UDF3 that is going to appear to the viewer if the viewer is looking down the three-dimensional map image TDF in the vertical direction from a visual point obtained as a result of the correction process, and displays the specific one of the two-dimensional right-under long-shot map images UDF1 to UDF3 on the display screen of the display section 20.

When the user arbitrarily specifies a user-specified point on the display screen of the display section 20 displaying the specific one of the two-dimensional slantingly-under long-shot map images DDF1 to DDF3, the navigation apparatus 10 takes a specified-point corresponding point, which exists on the three-dimensional map plane TDG of the three-dimensional map image TDF as a point corresponding to a confirmed user-specified point for the user-specified point, as a focus position, and sets the set target visual-point position of a set target visual point separated away from the three-dimensional map image TDF in a slanting upward direction. Then, the navigation apparatus 10 corrects the set target visual-point position of the set target visual point separated away from the three-dimensional map image TDF in a slanting upward direction so as to make the specified-point corresponding point on the three-dimensional map image TDF face the confirmed user-specified point on the display screen of the display section 20, and sets the corrected set target visual-point position. Thus, the navigation apparatus 10 converts the three-dimensional map image TDF constructed in the three-dimensional virtual space TDA into any specific one of the two-dimensional slantingly-under long-shot map images DDF1 to DDF3 by projecting the three-dimensional map image TDF onto a two-dimensional plane in order to result in the specific one of the two-dimensional slantingly-under long-shot map images DDF1 to DDF3 that is going to appear to the viewer if the viewer is looking down the three-dimensional map image TDF in a slanting direction from a visual point obtained as a result of the correction process, and displays the specific one of the two-dimensional slantingly-under long-shot map images DDF1 to DDF3 on the display screen of the display section 20.

Thus, in a process to switch the display screen of the display section 20 from the two-dimensional slantingly-under long-shot map image DDF1, DDF2 or DDF3 to the two-dimensional right-under long-shot map image UDF1, UDF2 or UDF3, the navigation apparatus 10 is capable of making the specified-point corresponding point on the three-dimensional map plane TDG of the three-dimensional map image TDF face the confirmed user-specified point on the display screen of the display section 20 through the two-dimensional right-under long-shot map image UDF1, UDF2 or UDF3. In a process to switch the display screen of the display section 20 from the two-dimensional right-under long-shot map image UDF1, UDF2 or UDF3 to the two-dimensional slantingly-under long-shot map image DDF1, DDF2 or DDF3, on the other hand, the navigation apparatus 10 is capable of making the specified-point corresponding point on the three-dimensional map plane TDG of the three-dimensional map image TDF face the confirmed user-specified point on the display screen of the display section 20 through the two-dimensional slantingly-under long-shot map image DDF1, DDF2 or DDF3.

In accordance with the configuration described above, the navigation apparatus 10 converts the three-dimensional map image TDF constructed in the three-dimensional virtual space TDA into any specific one of the two-dimensional slantingly-under long-shot map images DDF1 to DDF3 by projecting the three-dimensional map image TDF onto a two-dimensional plane in order to result in the specific one of the two-dimensional slantingly-under long-shot map images DDF1 to DDF3 that is going to appear to the viewer if the viewer is looking down the three-dimensional map image TDF in a slanting direction from a predetermined visual point separated away from the three-dimensional map image TDF in a slanting upward direction at a predetermined visual-line angle θ1, and displays the specific one of the two-dimensional slantingly-under long-shot map images DDF1 to DDF3 on the display screen of the display section 20. In this state, when the user arbitrarily specifies a user-specified point on the display screen of the display section 20 displaying the specific one of the two-dimensional slantingly-under long-shot map images DDF1 to DDF3, the navigation apparatus 10 takes a specified-point corresponding point, which exists on the three-dimensional map plane TDG of the three-dimensional map image TDF as a point corresponding to a confirmed user-specified point for the user-specified point, as a focus position, and sets the set target visual-point position of a set target visual point existing at a position right above the three-dimensional map image TDF at a visual-line angle θ2 different from the predetermined visual-line angle θ1 so as to make the specified-point corresponding point on the three-dimensional map image TDF face the confirmed user-specified point on the display screen of the display section 20. Then, the navigation apparatus 10 converts the three-dimensional map image TDF constructed in the three-dimensional virtual space TDA into any specific one of the two-dimensional right-under long-shot map images UDF1 to UDF3 by projecting the three-dimensional map image TDF onto a two-dimensional plane in order to result in the specific one of the two-dimensional right-under long-shot map images UDF1 to UDF3 that is going to appear to the viewer if the viewer is looking down the three-dimensional map image TDF in the vertical direction from the visual point located at the set visual-point position, and displays the specific one of the two-dimensional right-under long-shot map images UDF1 to UDF3 on the display screen of the display section 20. Thus, in a process to switch the display screen of the display section 20 from the two-dimensional slantingly-under long-shot map image DDF1, DDF2 or DDF3 to the two-dimensional right-under long-shot map image UDF1, UDF2 or UDF3, the navigation apparatus 10 is capable of making the specified-point corresponding point on the three-dimensional map plane TDG of the three-dimensional map image TDF face the confirmed user-specified point on the display screen of the display section 20 through the two-dimensional right-under long-shot map image UDF1, UDF2 or UDF3. As a result, the navigation apparatus 10 is capable of avoiding confusion about a positional relation between the two-dimensional slantingly-under long-shot map image DDF1, DDF2 or DDF3 and the two-dimensional right-under long-shot map image UDF1, UDF2 or UDF3 at the time the display screen of the display section 20 is switched from the two-dimensional slantingly-under long-shot map image DDF1, DDF2 or DDF3 to the two-dimensional right-under long-shot map image UDF1, UDF2 or UDF3.

Also in accordance with the configuration described above, the navigation apparatus 10 converts the three-dimensional map image TDF constructed in the three-dimensional virtual space TDA into any specific one of the two-dimensional right-under long-shot map images UDF1 to UDF3 by projecting the three-dimensional map image TDF onto a two-dimensional plane in order to result in the specific one of the two-dimensional right-under long-shot map images UDF1 to UDF3 that is going to appear to the viewer if the viewer is looking down the three-dimensional map image TDF in the vertical direction from a visual point at a predetermined visual-line angle θ2, and displays the specific one of the two-dimensional right-under long-shot map images UDF1 to UDF3 on the display screen of the display section 20. In this state, when the user arbitrarily specifies a user-specified point on the display screen of the display section 20 displaying the specific one of the two-dimensional right-under long-shot map images UDF1 to UDF3, the navigation apparatus 10 takes a specified-point corresponding point, which exists on the three-dimensional map plane TDG of the three-dimensional map image TDF as a point corresponding to a confirmed user-specified point for the user-specified point, as a focus position, and sets the set target visual-point position of a set target visual point separated away from the TDF in a slanting upward direction at a visual-line angle θ1 different from the predetermined visual-line angle θ2 so as to make the specified-point corresponding point on the three-dimensional map image TDF face the confirmed user-specified point on the display screen of the display section 20. Then, the navigation apparatus 10 converts the three-dimensional map image TDF constructed in the three-dimensional virtual space TDA into any specific one of the two-dimensional slantingly-under long-shot map images DDF1 to DDF3 by projecting the three-dimensional map image TDF onto a two-dimensional plane in order to result in the specific one of the two-dimensional slantingly-under long-shot map images DDF1 to DDF3 that is going to appear to the viewer if the viewer is looking down the three-dimensional map image TDF in the slanting direction from the visual point located at the set visual-point position, and displays the specific one of the two-dimensional slantingly-under long-shot map images DDF1 to DDF3 on the display screen of the display section 20. Thus, in a process to switch the display screen of the display section 20 from the two-dimensional right-under long-shot map image UDF1, UDF2 or UDF3 to the two-dimensional slantingly-under long-shot map image DDF1, DDF2 or DDF3, the navigation apparatus 10 is capable of making the specified-point corresponding point on the three-dimensional map plane TDG of the three-dimensional map image TDF face the confirmed user-specified point on the display screen of the display section 20 through the two-dimensional slantingly-under long-shot map image DDF1, DDF2 or DDF3. As a result, the navigation apparatus 10 is capable of avoiding confusion about a positional relation between the two-dimensional slantingly-under long-shot map image DDF1, DDF2 or DDF3 and the two-dimensional right-under long-shot map image UDF1, UDF2 or UDF3 at the time the display screen of the display section 20 is switched from the two-dimensional right-under long-shot map image UDF1, UDF2 or UDF3 to the two-dimensional slantingly-under long-shot map image DDF1, DDF2 or DDF3.

In addition, when the user specifies a user-specified point on the display screen of the display section 20 in the two-dimensional slantingly-under long-shot map image display mode, the navigation apparatus 10 determines the interpolated visual-point position of an interpolated visual point between the set reference visual point and the set target visual point. Then, in a process to switch the display screen of the display section 20 from the two-dimensional slantingly-under long-shot map image DDF1, DDF2 or DDF3 to the two-dimensional right-under long-shot map image UDF1, UDF2 or UDF3, the navigation apparatus 10 corrects the interpolated visual-point position and makes use of a visual-point position obtained as the result of the correction process to generate a two-dimensional map image from the three-dimensional map image TDF and displays the two-dimensional map image on the display screen of the display section 20. Thus, the navigation apparatus 10 is capable of changing the displayed image shown to the user from a state of looking down the three-dimensional map image TDF in a slanting direction from a visual point separated away from the three-dimensional map image TDF in a slanting upward direction to a final state of looking down a widened area widened area WA1 of the three-dimensional map image TDF as an enlarged view from a visual point existing at a position right above the widened area widened area WA1 by narrowing a portion including the specified-point corresponding point on the three-dimensional map plane TDG little by little in a zoom-up operation while rotating the visual point to a position right above the three-dimensional map image TDF with the specified-point corresponding point on the three-dimensional map plane TDG kept in a state of facing the user-specified point on the display screen as it is. As a result, by continuously changing the two-dimensional map image, the navigation apparatus 10 is capable of more clearly notifying the user of a positional relation between the two-dimensional slantingly-under long-shot map image DDF1, DDF2 or DDF3 and the two-dimensional right-under long-shot map image UDF1, UDF2 or UDF3.

On top of that, also when the user specifies a user-specified point on the display screen of the display section 20 in the two-dimensional right-under long-shot map image display mode, the navigation apparatus 10 determines the interpolated visual-point position of an interpolated visual point between the set reference visual point and the set target visual point. Then, in a process to switch the display screen of the display section 20 from the two-dimensional right-under long-shot map image UDF1, UDF2 or UDF3 to the two-dimensional slantingly-under long-shot map image DDF1, DDF2 or DDF3, the navigation apparatus 10 corrects the interpolated visual-point position and makes use of a visual-point position obtained as the result of the correction process to generate a two-dimensional map image from the three-dimensional map image TDF and displays the two-dimensional map image on the display screen of the display section 20. Thus, the navigation apparatus 10 is capable of changing the displayed image shown to the user from a state of looking down a widened area widened area WA2 of the three-dimensional map image TDF in the vertical direction from a visual point existing at a position right above the widened area widened area WA2 as an enlarged view to a final state of looking down the three-dimensional map image TDF in a slanting direction from a visual point separated away from the three-dimensional map image TDF in a slanting upward direction by narrowing a portion including the specified-point corresponding point on the three-dimensional map plane TDG little by little in a zoom-out operation while rotating the visual point to a position separated away from the three-dimensional map image TDF in the slanting upward direction with the specified-point corresponding point on the three-dimensional map plane TDG kept in a state of facing the user-specified point on the display screen as it is. As a result, by continuously changing the two-dimensional map image, the navigation apparatus 10 is capable of more clearly notifying the user of a positional relation between the two-dimensional slantingly-under long-shot map image DDF1, DDF2 or DDF3 and the two-dimensional right-under long-shot map image UDF1, UDF2 or UDF3.

In addition, in a process to switch the display screen of the display section 20 from a two-dimensional map image to another, the navigation apparatus 10 displays the frame of a widened area WA1 for generating the two-dimensional right-under long-shot map image UDF2 as a next image to replace the two-dimensional slantingly-under long-shot map image DDF1 or DDF3 on the three-dimensional map image TDF, or displays the frame of a widened area WA2 corresponding to the two-dimensional right-under long-shot map image UDF3 already replaced by the two-dimensional slantingly-under long-shot map image DDF3 on the three-dimensional map image TDF. Thus, the navigation apparatus 10 is capable of clearly notifying the user of a positional relation between the two-dimensional slantingly-under long-shot map image DDF1, DDF2 or DDF3 and the two-dimensional right-under long-shot map image UDF1, UDF2 or UDF3.

When the user arbitrarily specifies a user-specified point on the display screen of the display section 20 and the projection point of the user-specified point is at a position outside the three-dimensional map plane TDG in the three-dimensional virtual space TDA, the navigation apparatus 10 moves the projection point to a position inside the three-dimensional map plane TDG and takes the projection point as a specified-point corresponding point. Subsequently, the navigation apparatus 10 converts the three-dimensional space coordinate values of the specified-point corresponding point into two-dimensional plane coordinate values on the display screen and, then, takes the two-dimensional plane coordinate values as specified-point two-dimensional plane coordinate values of a confirmed user-specified point, which is confirmed as a point showing a visual-point position specified by the user to be used for changing a visual point. Thus, even when the user arbitrarily specifies a user-specified point on the display screen of the display section 20 displaying one of the two-dimensional slantingly-under long-shot map image DDF1 to DDF3 and the projection point of the user-specified point is at a position outside the three-dimensional map plane TDG in the three-dimensional virtual space TDA, the navigation apparatus 10 is capable of preventively avoiding a wasteful display of one of the two-dimensional right-under long-shot map images UDF1 to UDF3 with the three-dimensional map image TDF almost not drawn thereon on the display screen of the display section 20.

In the embodiment described above, a finite three-dimensional map plane TDG is placed on the XY plane in the three-dimensional virtual space TDA and a three-dimensional map image TDF is then generated. It is to be noted, however, that the scope of the present invention is by no means limited to this embodiment. For example, it is also possible to provide a configuration in which an infinite three-dimensional map plane is placed on the XY plane of a finite or infinite three-dimensional virtual space or a plane is merely defined and a three-dimensional map image is then generated. In accordance with this configuration, when the user arbitrarily specifies a user-specified point on the display screen of the display section 20, the projection point of the user-specified point is never located at a position outside the plane. Thus, the step SP202 can be eliminated from the flowchart representing the drawing-contents determination processing sub-procedure SRT2 of the display control processing procedure RT1 described earlier. As a result, since the drawing-contents determination processing sub-procedure SRT2 can be made simpler in accordance with this configuration, the processing load borne by the central processing unit 11 can be reduced.

In addition, in the embodiment described above, in a process to switch the display screen of the display section 20 from the two-dimensional slantingly-under long-shot map image DDF1, DDF2 or DDF3 to the two-dimensional right-under long-shot map image UDF1, UDF2 or UDF3 or vice versa, an inserted two-dimensional map image showing how the display contents are changed is displayed. It is to be noted, however, that the scope of the present invention is by no means limited to this embodiment. For example, it is also possible to provide a configuration for carrying out the process to switch the display screen of the display section 20 from the two-dimensional slantingly-under long-shot map image DDF1, DDF2 or DDF3 to the two-dimensional right-under long-shot map image UDF1, UDF2 or UDF3 or vice versa without displaying such an inserted two-dimensional map image.

On top of that, in the embodiment described above, in a two-dimensional slantingly-under long-shot map image display mode, any one of the two-dimensional slantingly-under long-shot map images DDF1 to DDF each allowing almost all of the three-dimensional map image TDF to be drawn is displayed. In the two-dimensional right-under long-shot map image display mode, on the other hand, any one of the two-dimensional right-under long-shot map image UDF1 to UDF3 each allowing a portion of the three-dimensional map image TDF to be drawn as an enlarged portion is displayed. It is to be noted, however, that the scope of the present invention is by no means limited to this embodiment. For example, it is possible to provide a configuration in which a two-dimensional map image in a range different from that of the embodiment is displayed in both the two-dimensional slantingly-under long-shot map image display mode and the two-dimensional right-under long-shot map image display mode. It is also possible to provide a configuration in which the range of the two-dimensional map image to be displayed is selected in advance or set arbitrarily for the user. Moreover, it is also possible to provide a configuration in which the user is allowed to arbitrarily select a visual-point altitude, a visual-line angle and a focal distance.

In addition, in the embodiment described above, in order to convert the three-dimensional map image TDF into a two-dimensional map image, two visual points having visual-line angles different from each other are used.

It is to be noted, however, that the scope of the present invention is by no means limited to this embodiment. For example, it is possible to provide a configuration in which, in order to convert the three-dimensional map image TDF into a two-dimensional map image, three or more visual points having different visual-line directions and/or different visual-line angles are used in a fixed way or selectively.

On top of that, in the embodiment described above, in a process to generate any one of the two-dimensional slantingly-under long-shot map images DDF1 to DDF3 and the two-dimensional right-under long-shot map images UDF1 to UDF3 from the three-dimensional map image TDF, the set target visual-point position of a set target visual point is corrected. It is to be noted, however, that the scope of the present invention is by no means limited to this embodiment. For example, it is possible to provide a configuration in which the set target visual-point position of a set target visual point is corrected only in a process to generate a specific one of the two-dimensional slantingly-under long-shot map images DDF1 to DDF3 and the two-dimensional right-under long-shot map images UDF1 to UDF3 from the three-dimensional map image TDF.

In addition, in the embodiment described above, the three-dimensional map image TDF constructed in the three-dimensional virtual space TDA is converted into a two-dimensional map image by projecting the three-dimensional map image TDF on a two-dimensional plane. It is to be noted, however, that the scope of the present invention is by no means limited to this embodiment. For example, it is possible to provide a configuration in which a three-dimensional spatial image constructed in a three-dimensional virtual space as an image having a type different from the three-dimensional map image TDF is converted into a two-dimensional planar image by projecting the three-dimensional spatial image on a two-dimensional plane. An example of the three-dimensional spatial image having a type different from the three-dimensional map image TDF is a stereoscopic office environment image. Typically, the stereoscopic office environment image has icons such as a folder and a file, which are placed in a shelf or on a table to be used in data management.

On top of that, in the embodiment described above, the display control processing procedure RT1 represented by the flowcharts shown in FIGS. 11 to 14 is carried out by execution of a display control program stored in advance in the ROM 13.

It is to be noted, however, that the scope of the present invention is by no means limited to this embodiment. For example, it is possible to provide a configuration in which, in addition to the display control program stored in advance in the ROM 13, a variety of other display control programs having configurations different from each other are each installed from one of program storage mediums for recording the other programs into the hard-disk drive 17 employed in the navigation apparatus 10 and any one of the other programs is then loaded from the hard-disk drive 17 into the RAM 14 to be executed in order to carry out the display control processing procedure RT1.

In addition, the embodiment described above applies the display control apparatus provided by the present invention to the navigation apparatus 10 explained earlier by referring to FIGS. 1 to 14. It is to be noted, however, that the scope of the present invention is by no means limited to this embodiment. For example, the present invention can also be applied to apparatus including a PDA (Personal Digital Assistant), an information processing apparatus such as a game machine, a video camera, a digital camera and a recording/reproduction apparatus such as a DVD (Digital Versatile Disc) recorder or a hard-disc recorder. That is to say, the present invention can be applied to a wide range of display control apparatus having a variety of configurations as long as the display control apparatus are each required to be capable of converting a three-dimensional spatial image into a two-dimensional planar image and displaying the two-dimensional planar image on a display screen.

On top of that, in the embodiment described above, the central processing unit 11 explained earlier by referring to FIGS. 1 to 14 functions as an image conversion unit for converting a three-dimensional spatial image constructed in a three-dimensional virtual space into a first two-dimensional planar image by projecting the three-dimensional spatial image onto a two-dimensional plane in order to result in the first two-dimensional planar image that will be obtained if the viewer sees the three-dimensional spatial image from a first visual point at a first visual-line angle and converting the three-dimensional spatial image into a second two-dimensional planar image by projecting the three-dimensional spatial image onto the two-dimensional plane in order to result in the second two-dimensional planar image that will be obtained if the viewer sees the three-dimensional spatial image from a second visual point at a second visual-line angle different from the first visual-line angle. It is to be noted, however, that the scope of the present invention is by no means limited to this embodiment. For example, it is possible to provide a configuration in which any unit pertaining to range of other image conversion units having a variety of types is used as the aforementioned image conversion unit implemented by the central processing unit 11. An example of the other image conversion units is an image conversion circuit having an actual hardware configuration identical with the visual-point correction unit 35 shown in FIG. 7 as a visual-point correction unit.

In addition, in the embodiment described above, the display unit 18 explained earlier by referring to FIGS. 1 to 14 is used as a display unit for displaying a first or second two-dimensional planar image on the display screen thereof by switching the display screen from the first two-dimensional planar image to the second two-dimensional planar image and vice versa. It is to be noted, however, that the scope of the present invention is by no means limited to this embodiment. For example, it is possible to provide a configuration in which any unit pertaining to range of other display units having a variety of types is used as the aforementioned display unit. An example of the other display units is an external display unit connected to the display control apparatus.

On top of that, in the embodiment described above, the input unit 23 having a touch panel as explained earlier by referring to FIGS. 1 to 14 is used as a point specifying unit for arbitrarily specifying the position of a point as the position of a visual point on the display screen of the display unit. It is to be noted, however, that the scope of the present invention is by no means limited to this embodiment. For example, it is possible to provide a configuration in which any unit pertaining to range of other point specifying units having a variety of types is used as the aforementioned point specifying unit. An example of the other point specifying units is a pointing device such as a mouse or a joy stick.

In addition, in the embodiment described above, the central processing unit 11 explained earlier by referring to FIGS. 1 to 14 is used as a visual-point position setting unit for setting the visual-point position of a second visual point so as to make a specified-point corresponding point existing on a three-dimensional spatial image as a point corresponding to a specified point face the specified point, which is arbitrarily specified through a point specifying unit as a point on the display screen of the display unit showing a first two-dimensional planar image. It is to be noted, however, that the scope of the present invention is by no means limited to this embodiment. For example, it is possible to provide a configuration in which any unit pertaining to range of other visual-point position specifying units having a variety of types is used as the aforementioned visual-point position specifying unit implemented by the central processing unit 11. An example of the other visual-point position specifying units is a visual-point position specifying circuit having an actual hardware configuration identical with the visual-point correction unit 35 shown in FIG. 7 as a visual-point correction unit.

On top of that, in the embodiment described above, the central processing unit 11 explained earlier by referring to FIGS. 1 to 14 is used as a target visual-point position setting unit for setting a target visual-point position at a second visual-line angle so as to adjust a focus to a specified-point corresponding point existing on a three-dimensional spatial image as a point corresponding to a specified point arbitrarily specified through a point specifying unit as a point on the display screen of the display unit showing a first two-dimensional planar image. It is to be noted, however, that the scope of the present invention is by no means limited to this embodiment. For example, it is possible to provide a configuration in which any unit pertaining to a wide range of other target visual-point position specifying units having a variety of types is used as the aforementioned target visual-point position specifying unit implemented by the central processing unit 11. An example of the other target visual-point position specifying units is a target visual-point position specifying circuit having an actual hardware configuration identical with the visual-point information determination unit 34 shown in FIG. 7 as a visual-point information determination unit.

In addition, in the embodiment described above, the central processing unit 11 explained earlier by referring to FIGS. 1 to 14 is used as a visual-point position correction unit for correcting the visual-point position of a target visual-point position at a second visual-line angle to the visual-point position of a second visual point so as to make a specified-point corresponding point existing on a three-dimensional spatial image as a point corresponding to a specified point face the specified point, which is arbitrarily specified through a point specifying unit as a point on the display screen of the display unit. It is to be noted, however, that the scope of the present invention is by no means limited to this embodiment. For example, it is possible to provide a configuration in which any unit pertaining to a wide range of other visual-point position correction units having a variety of types is used as the aforementioned visual-point position correction unit implemented by the central processing unit 11. An example of the other visual-point position correction units is a visual-point position correction circuit having an actual hardware configuration identical with the visual-point correction unit 35 shown in FIG. 7 as a visual-point information determination unit.

On top of that, in the embodiment described above, the central processing unit 11 explained earlier by referring to FIGS. 1 to 14 is used as a reference visual-point position setting unit for setting a reference visual-point position at a first visual-line angle as a position adjusting a focus to a specified-point corresponding point existing on a three-dimensional spatial image as a point corresponding to a specified point arbitrarily specified through a point specifying unit as a point on the display screen of the display unit showing a first two-dimensional planar image. It is to be noted, however, that the scope of the present invention is by no means limited to this embodiment. For example, it is possible to provide a configuration in which any unit pertaining to a wide range of other reference visual-point position setting units having a variety of types is used as the aforementioned reference visual-point position setting unit implemented by the central processing unit 11. An example of the other reference visual-point position setting units is a reference visual-point position setting circuit having an actual hardware configuration identical with the visual-point information determination unit 34 shown in FIG. 7 as a visual-point information determination unit.

In addition, in the embodiment described above, the central processing unit 11 explained earlier by referring to FIGS. 1 to 14 is used as an interpolation unit for carrying out an interpolation process to find the interpolated visual-point position of an interpolated visual point between a reference visual-point position at a first visual-line angle and a target visual-point position at a second visual-line angle. It is to be noted, however, that the scope of the present invention is by no means limited to this embodiment. For example, it is possible to provide a configuration in which any unit pertaining to a wide range of other interpolation units having a variety of types is used as the aforementioned interpolation unit implemented by the central processing unit 11. An example of the other interpolation units is an interpolation circuit having an actual hardware configuration identical with the visual-point information determination unit 34 shown in FIG. 7 as a visual-point information determination unit.

On top of that, in the embodiment described above, the central processing unit 11 explained earlier by referring to FIGS. 1 to 14 is used as a target visual-point position setting unit for setting a target visual-point position at a first visual-line angle so as to adjust a focus to a specified-point corresponding point existing on a three-dimensional spatial image as a point corresponding to a specified point arbitrarily specified through a point specifying unit as a point on the display screen of the display unit showing a second two-dimensional planar image. It is to be noted, however, that the scope of the present invention is by no means limited to this embodiment. For example, it is possible to provide a configuration in which any unit pertaining to a wide range of other target visual-point position setting units having a variety of types is used as the aforementioned target visual-point position setting unit implemented by the central processing unit 11. An example of the other target visual-point position setting units is a target visual-point position setting circuit having an actual hardware configuration identical with the visual-point information determination unit 34 shown in FIG. 7 as a visual-point information determination unit.

In addition, the embodiment described above, the central processing unit 11 explained earlier by referring to FIGS. 1 to 14 is used as a visual-point position correction unit for correcting a target visual-point position at a first visual-line angle to the visual-point position of a first visual point so as to make a specified-point corresponding point existing on a three-dimensional spatial image as a point corresponding to a specified point face the specified point, which is arbitrarily specified through a point specifying unit as a point on the display screen of the display unit. It is to be noted, however, that the scope of the present invention is by no means limited to this embodiment. For example, it is possible to provide a configuration in which any unit pertaining to a wide range of other visual-point position correction units having a variety of types is used as the aforementioned visual-point position correction unit implemented by the central processing unit 11. An example of the other visual-point position correction units is a visual-point position correction circuit having an actual hardware configuration identical with the visual-point correction unit 35 shown in FIG. 7 as a visual-point correction unit.

On top of that, in the embodiment described above, the central processing unit 11 explained earlier by referring to FIGS. 1 to 14 is used as a reference visual-point position setting unit for setting a reference visual-point position at a second visual-line angle as a position adjusting a focus to a specified-point corresponding point existing on a three-dimensional spatial image as a point corresponding to a specified point arbitrarily specified through a point specifying unit as a point on the display screen of the display unit showing a second two-dimensional planar image. It is to be noted, however, that the scope of the present invention is by no means limited to this embodiment. For example, it is possible to provide a configuration in which any unit pertaining to a wide range of other reference visual-point position setting units having a variety of types is used as the aforementioned reference visual-point position setting unit implemented by the central processing unit 11. An example of the other reference visual-point position setting units is a reference visual-point position setting circuit having an actual hardware configuration identical with the visual-point information determination unit 34 shown in FIG. 7 as a visual-point information determination unit.

In addition, in the embodiment described above, the central processing unit 11 explained earlier by referring to FIGS. 1 to 14 is used as an interpolation unit for carrying out an interpolation process to find an interpolated visual-point position of an interpolated visual point between a reference visual-point position at a second visual-line angle and a target visual-point position at a first visual-line angle. It is to be noted, however, that the scope of the present invention is by no means limited to this embodiment. For example, it is possible to provide a configuration in which any unit pertaining to a wide range of other interpolation units having a variety of types is used as the aforementioned interpolation unit implemented by the central processing unit 11. An example of the other interpolation units is an interpolation circuit having an actual hardware configuration identical with the visual-point information determination unit 34 shown in FIG. 7 as a visual-point information determination unit.

The present invention can be applied to a navigation apparatus and a display control apparatus, which are each used for controlling an operation to display a two-dimensional planar image obtained as a result of projecting a three-dimensional spatial image onto a two-dimensional plane. An example of the display control apparatus is a personal computer.

Moreover, it should be understood by those skilled in the art that a variety of modifications, combinations, sub-combinations and alterations may occur in dependence on design requirements and other factors insofar as they are within the scope of the appended claims or the equivalents thereof.

The invention claimed is:

1. A display control apparatus comprising:
an image conversion unit configured to convert a three-dimensional spatial image constructed in a three-dimensional virtual space associated with a three-dimensional map plane into a first two-dimensional planar image by projecting said three-dimensional spatial image on a two-dimensional plane to result in said first two-dimensional planar image obtained if said three-dimensional spatial image is viewed from a first visual point at a first visual-line angle and for converting said three-dimensional spatial image into a second two-dimensional planar image by projecting said three-dimensional spatial image on said two-dimensional plane to result in said second two-dimensional planar image obtained if said three-dimensional spatial image is viewed from a second visual point at a second visual-line angle different from said first visual-line angle;
a display unit configured to show one of said first and second two-dimensional planar images on a display screen of said display unit by switching said display screen from said first two-dimensional planar image to said second two-dimensional planar image or vice versa;
a point specifying unit used for arbitrarily specifying a point, which is to be used as a point for specifying a visual-point position, on said display screen of said display unit; and
a visual-point position setting unit configured to set the visual-point position of said second visual point so as to make a specified-point corresponding point existing on said three-dimensional spatial image as a point corresponding to a specified point face said specified point, which is arbitrarily specified through said point specifying unit as a point on said display screen of said display unit showing said first two-dimensional planar image,
the three-dimensional map plane being a finite plane defined by a plurality of sides, and when the specified-point corresponding point lies outside the three-dimensional map plane, the specified point corresponding point is moved toward a side of the three-dimensional map plane that is closest to the specified-point corresponding point such that the specified-point corresponding point lies within the three-dimensional map plane.

2. The display control apparatus according to claim 1, said display control apparatus further comprising:
a target visual-point position setting unit configured to set a target visual-point position at said second visual-line angle so as to adjust a focus to said specified-point corresponding point existing on said three-dimensional spatial image as a point corresponding to a specified point, which is arbitrarily specified through said point specifying unit as a point on said display screen of said display unit showing said first two-dimensional planar image; and
a visual-point position correction unit for correcting said target visual-point position at said second visual-line angle to the visual-point position of said second visual point so as to make said specified-point corresponding point on said three-dimensional spatial image face said specified point.

3. The display control apparatus according to claim 2, said display control apparatus further comprising:

a reference visual-point position setting unit configured to set a reference visual-point position at said first visual-line angle as a position adjusting a focus to said specified-point corresponding point existing on said three-dimensional spatial image as a point corresponding to a specified point, which is arbitrarily specified through said point specifying unit as a point on said display screen of said display unit showing said first two-dimensional planar image; and an interpolation unit configured to carry out an interpolation process to find the interpolated visual-point position of an interpolated visual point between said reference visual-point position at said first visual-line angle and said target visual-point position at said second visual-line angle; wherein said visual-point position correction unit corrects said interpolated visual-point position of said interpolated visual point to a corrected interpolated visual-point position of said interpolated visual point so as to make said specified-point corresponding point on said three-dimensional spatial image face said specified point;

said image conversion unit converts said three-dimensional spatial image into a two-dimensional planar image by projecting said three-dimensional spatial image on said two-dimensional plane to result in said second two-dimensional planar image obtained if said three-dimensional spatial image is viewed from said corrected interpolated visual-point position of said interpolated visual point; and said display unit displays said two-dimensional planar image produced by said image conversion unit in the course of a process to switch said display screen from said first two-dimensional planar image to said second two-dimensional planar image.

4. The display control apparatus according to claim 1 wherein said visual-point position setting unit sets the visual-point position of said first visual point so as to make said specified-point corresponding point existing on said three-dimensional spatial image as a point corresponding to a specified point face a specified point, which is arbitrarily specified through said point specifying unit as a point on said display screen of said display unit showing said second two-dimensional planar image.

5. The display control apparatus according to claim 4, said display control apparatus further comprising:

a target visual-point position setting unit configured to set a target visual-point position at said first visual-line angle so as to adjust a focus to said specified-point corresponding point existing on said three-dimensional spatial image as a point corresponding to a specified point, which is arbitrarily specified through said point specifying unit as a point on said display screen of said display unit showing said second two-dimensional planar image; and a visual-point position correction unit configured to correct said target visual-point position at said first visual-line angle to the visual-point position of said first visual point so as to make said specified-point corresponding point on said three-dimensional spatial image face said specified point.

6. The display control apparatus according to claim 5, said display control apparatus further comprising:

a reference visual-point position setting unit configured to set a reference visual-point position at said second visual-line angle as a position adjusting a focus to said specified-point corresponding point existing on said three-dimensional spatial image as a point corresponding to a specified point, which is arbitrarily specified through said point specifying unit as a point on said display screen of said display unit showing said second two-dimensional planar image; and an interpolation unit configured to carry out an interpolation process to find the interpolated visual-point position of an interpolated visual point between said reference visual-point position at said second visual-line angle and said target visual-point position at said first visual-line angle; wherein said visual-point position correction unit corrects said interpolated visual-point position of said interpolated visual point to a corrected interpolated visual-point position of said interpolated visual point so as to make said specified-point corresponding point on said three-dimensional spatial image face said specified point;

said image conversion unit converts said three-dimensional spatial image into a two-dimensional planar image by projecting said three-dimensional spatial image on said two-dimensional plane to result in said second two-dimensional planar image obtained if said three-dimensional spatial image is viewed from said corrected interpolated visual-point position of said interpolated visual point; and said display unit displays said two-dimensional planar image produced by said image conversion unit in the course of a process to switch said display screen from said second two-dimensional planar image to said first two-dimensional planar image.

7. A display control method comprising:

converting a three-dimensional spatial image constructed in a three-dimensional virtual space associated with a three-dimensional map plane into a first two-dimensional planar image by projecting said three-dimensional spatial image on a two-dimensional plane to result in said first two-dimensional planar image obtained if said three-dimensional spatial image is viewed from a first visual point at a first visual-line angle, converting said three-dimensional spatial image into a second two-dimensional planar image by projecting said three-dimensional spatial image on said two-dimensional plane to result in said second two-dimensional planar image obtained if said three-dimensional spatial image is viewed from a second visual point at a second visual-line angle different from said first visual-line angle and showing one of said first and second two-dimensional planar images on a display screen of a display unit by switching said display screen from said first two-dimensional planar image to said second two-dimensional planar image or vice versa; and arbitrarily specifying a point, which is to be used as a point for specifying a visual-point position, on said display screen of said display unit through a point specifying unit used for arbitrarily specifying said specified point and setting the visual-point position of said second visual point so as to make a specified-point corresponding point existing on said three-dimensional spatial image as a point corresponding to said specified point face said specified point, which is arbitrarily specified through said point specifying unit on said display screen of said display unit showing said first two-dimensional planar image, the three-dimensional map plane being a finite plane defined by a plurality of sides, and when the specified-point corresponding point lies outside the three-dimensional map plane, the specified point corresponding point is moved toward a side of the three-dimensional map plane that is closest to the specified-point corresponding point such that the specified-point corresponding point lies within the three-dimensional map plane.

8. A computer-readable memory storing a display control program for executing:

converting a three-dimensional spatial image constructed in a three-dimensional virtual space associated with a three-dimensional map plane into a first two-dimensional planar image by projecting said three-dimensional spatial image on a two-dimensional plane to result in said first two-dimensional planar image obtained if said three-dimensional spatial image is viewed from a first visual point at a first visual-line angle, converting said three-dimensional spatial image into a second two-dimensional planar image by projecting said three-dimensional spatial image on said two-dimensional plane to result in said second two-dimensional planar image obtained if said three-dimensional spatial image is viewed from a second visual point at a second visual-line angle different from said first visual-line angle and showing one of said first and second two-dimensional planar images on a display screen of a display unit by switching said display screen from said first two-dimensional planar image to said second two-dimensional planar image or vice versa; and arbitrarily specifying a point, which is to be used as a point for specifying a visual-point position, on said display screen of said display unit through a point specifying unit used for arbitrarily specifying said specified point and setting the visual-point position of said second visual point so as to make a specified-point corresponding point existing on said three-dimensional spatial image as a point corresponding to said specified point face said specified point, which is arbitrarily specified through said point specifying unit on said display screen of said display unit showing said first two-dimensional planar image, the three-dimensional map plane being a finite plane defined by a plurality of sides, and when the specified-point corresponding point lies outside the three-dimensional map plane, the specified point corresponding point is moved toward a side of the three-dimensional map plane that is closest to the specified-point corresponding point such that the specified-point corresponding point lies within the three-dimensional map plane.

* * * * *